(12) United States Patent
Isono et al.

(10) Patent No.: US 6,382,737 B1
(45) Date of Patent: May 7, 2002

(54) APPARATUS IN BRAKING SYSTEM, FOR DIAGNOSING PRESSURIZING DEVICE BASED ON FLUID PRESSURE DETECTED DURING OPERATION OF THE DEVICE PRIOR TO OPERATION OF THE BRAKING SYSTEM

(75) Inventors: Hiroshi Isono, Toyota; Yasuji Mizutani, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/645,341

(22) Filed: Aug. 25, 2000

(30) Foreign Application Priority Data

Sep. 10, 1999 (JP) ............................................. 11-257334
Feb. 14, 2000 (JP) ........................................ 2000-035214

(51) Int. Cl.⁷ ............................................... B60T 8/44
(52) U.S. Cl. .................. 303/114.1; 303/20; 303/113.3; 188/358
(58) Field of Search ...................... 303/20, 12, 113.1, 303/113.3, 113.4, 114.1, 114.3; 188/353, 355–359; 701/71, 76; 60/545

(56) References Cited

U.S. PATENT DOCUMENTS

| 5,967,628 | A | * | 10/1999 | Abe et al. .................... 188/353 |
| 6,019,438 | A | * | 2/2000 | Sawada et al. ........... 303/113.4 |
| 6,062,656 | A | * | 5/2000 | Unterforsthuber et al. .. 188/356 |
| 6,276,763 | B1 | * | 8/2001 | Isono et al. .................. 188/358 |

FOREIGN PATENT DOCUMENTS

| DE | 37 16 515 A1 | 11/1998 |
| JP | 10-236294 | 9/1998 |

* cited by examiner

Primary Examiner—Pam Rodriguez
(74) Attorney, Agent, or Firm—Oliff & Berridge PLC

(57) ABSTRACT

A diagnosing apparatus for diagnosing a pressurizing device provided in a hydraulically operated braking system operated by a brake operating member, wherein a hydraulic pressure detecting device is operable to detect a hydraulic pressure which is a sum of a first fluid pressure generated by an operation of the brake operating member, and a second fluid pressure generated by an operation of the pressurizing device, and a diagnosing device is operable to determine whether the pressurizing device is abnormal or not, on the basis of the hydraulic pressure detected while the brake operating member is not in operation and while the pressurizing device is in operation.

23 Claims, 14 Drawing Sheets

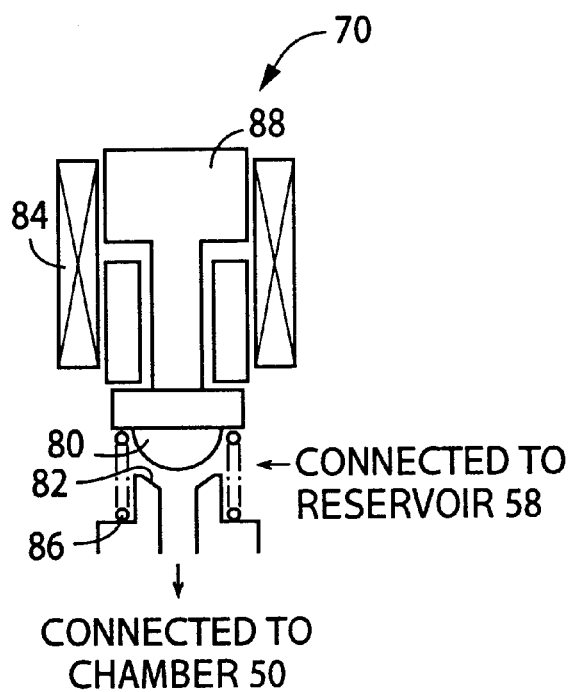
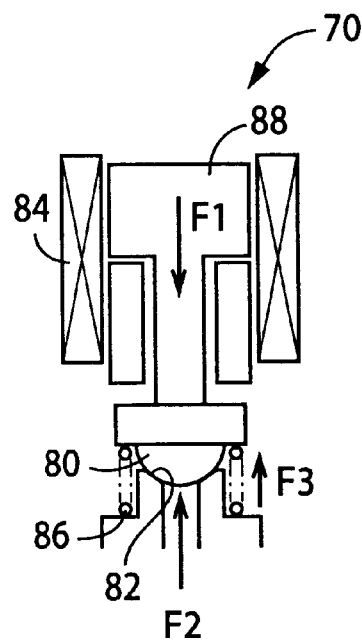
FIG. 2A
[IN OFF STATE OF OIL 84]
FIG. 2B
[IN ON STATE COIL 84]

APPARATUS IN BRAKING SYSTEM, FOR DIAGNOSING PRESSURIZING DEVICE BASED ON FLUID PRESSURE DETECTED DURING OPERATION OF THE DEVICE PRIOR TO OPERATION OF THE BRAKING SYSTEM

This application is based on Japanese Patent Application Nos. 11-257334 filed Sep. 10, 1999 and 2000–035214 filed Feb. 14, 2000, the contents of which are incorporated hereinto by reference.

BACKGROUND OF THE INVENTION

1. Field of the Invention

The present invention relates to an apparatus for detecting an abnormality of a pressurizing device in a hydraulically operated braking system.

2. Discussion of Related Art

JP-A-10-236294 discloses an example of such an apparatus for detecting an abnormality of a pressurizing device. This apparatus is adapted to detect an abnormality of a pressurizing device in the form of a vacuum booster (hereinafter referred to simply as "booster"), and includes (1) a master cylinder pressure detecting device for detecting a hydraulic pressure in a master cylinder which is arranged to generate the hydraulic pressure corresponding to an output force of the booster provided to boost a brake operating force acting on a brake operating member; (2) a booster pressure detecting device for detecting a hydraulic pressure in a variable-pressure chamber of the booster; and (3) a diagnosing device for determining whether the booster is abnormal, on the basis of a relationship between the hydraulic pressure detected by the master cylinder pressure detecting device and the hydraulic pressure detected by the booster pressure detecting device.

The hydraulic pressure in the variable-pressure chamber of the booster changes towards the atmospheric pressure as the brake operating force is increased. Accordingly, the hydraulic pressure in the variable-pressure chamber increases with an increase of the hydraulic pressure in the master cylinder. When the booster is normal, the hydraulic pressures in the variable-pressure chamber of the booster and the master cylinder have a predetermined relationship, that is, are held within respective predetermined ranges. If these two hydraulic pressures detected by the master cylinder pressure detecting device and the booster pressure detecting device are not held within the respective predetermined ranges, it is possible to determine that the booster is abnormal. Thus, the determination as to whether the booster is abnormal or not is effected in the known booster-diagnosing apparatus, while the brake operating member is in operation.

However, the known booster-diagnosing apparatus disclosed in the publication identified above is not capable of detecting an abnormality of the booster while the brake operating member is not in operation. This is because the booster is activated only when the brake operating member is operated.

SUMMARY OF THE INVENTION

It is therefore an object of the present invention to provide an apparatus which is capable of detecting an abnormality of a pressurizing device in a hydraulically operated system, even while the brake operating member is not in operation.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A diagnosing apparatus for diagnosing a pressurizing device provided in a hydraulically operated braking system operated by a brake operating member, comprising: a hydraulic pressure detecting device operable to detect a hydraulic pressure which is a sum of a first fluid pressure generated by an operation of said brake operating member, and a second fluid pressure generated by an operation of the pressurizing device; and a diagnosing device operable to determine whether the pressurizing device is abnormal or not, on the basis of the sum of the first and second fluid pressures detected while the brake operating member is not in operation and while the pressurizing device is in operation.

In the diagnosing apparatus according to the above mode (1) of this invention, the pressurizing device is diagnosed on the basis of a hydraulic pressure which is a sum of the first and second fluid pressures which are detected by the hydraulic pressure detecting device while the brake operating member is not in operation and while the pressurizing device is in operation. While the brake operating member is not in operation, the first fluid pressure is not generated by the brake operating member, so that the hydraulic pressure detected by the hydraulic pressure detecting device is equal to the second fluid pressure generated by the pressurizing device, more precisely, the second fluid pressure corresponding to the operating condition of the pressurizing device. Accordingly, the diagnosing device can be diagnosed while the brake operating member is not in operation.

As indicated above, the hydraulic pressure detected by the hydraulic pressure detecting device while the brake operating member is not in operation does not include a fluid pressure generated by the brake operating member.

Where a booster is connected to the brake operating member, as described before, the first fluid pressure corresponds to an output of the booster which is adapted to boost the operating force acting on the brake operating member. Namely, the first fluid pressure corresponds to the brake operating force as boosted by the booster.

(2) A diagnosing apparatus according to the above mode (1), further comprising a vehicle speed detecting device for detecting a running speed of an automotive vehicle on which the hydraulically operated braking system, and wherein the diagnosing device includes a determining portion operable to determine whether the pressurizing device is abnormal or not, on the basis of the hydraulic pressure detected while the running speed of the automotive vehicle detected by the vehicle speed detecting device is lower than a predetermined first threshold value.

While the vehicle running speed is lower than the predetermined first threshold value, there is a low possibility that the brake operating member is operated. In other words, the first threshold value is determined so that the possibility of the brake operating member at a vehicle running speed lower than the first threshold value is low. Accordingly, the pressuring device can be diagnosed while the brake operating member is not in operation, when the diagnosis is effected while the vehicle running speed is lower than the first threshold value.

The vehicle speed detecting device may be adapted to obtain the vehicle running speed on the basis of the rotating speed of the output shaft of a drive power source which drives the vehicle, or alternatively, on the basis of the rotating speeds of the vehicle wheels.

(3) A diagnosing apparatus according to the above mode (1) or (2), further comprising: a ready-state detecting device for determining whether an automotive vehicle on which the hydraulically operated braking system is provided is ready for running, or not; and a braking operation detecting device for determining whether the brake operating member is in operation or not, and wherein said diagnosing device includes a determining portion operable to determine whether the pressurizing device is abnormal or not, on the basis of the hydraulic pressure detected when said brake operation detecting device detects for the first time that the brake operating member is in operation, after the ready-state detecting device has detected that the automotive vehicle becomes ready for running.

In the diagnosing apparatus according to the above mode (3), the pressurizing device is diagnosed upon first detection that the brake operating member is not in operation after, the automotive vehicle becomes ready for running. Where the brake operating member is not in operation at the time when the automotive vehicle has become ready for running, the diagnosis of the pressurizing device is effected immediately after the vehicle has become ready for running. Where the brake operating member is already in operation when the automotive vehicle has become ready for running, the diagnosis is effected when a first operation of the brake operating member is detected after the vehicle has become ready for running.

The vehicle may be made ready for running as a result of an operation of a given operator-controlled member, or when a predetermined condition of the vehicle is satisfied. The operator-controlled member may be a main power switch, which may be an ignition switch operated by an ignition key, for starting a vehicle drive power source such as an engine. The predetermined condition of the vehicle may be a condition in which a load acting on the vehicle operator's seat is larger than a predetermined upper limit.

(4) A diagnosing apparatus according to any one of the above modes (1)–(3), wherein the hydraulic pressure detecting device is connected to a fluid passage provided to delivery a fluid pressurized by the pressurizing device to an actuator of the hydraulically operated system, the diagnosing apparatus further comprising: a fluid communication regulating device provided in a portion of the fluid passage between the hydraulic pressure detecting device and the actuator, and having an open state for non-restricted fluid communication between the pressurizing device and the actuator, and a restricted state for restricted fluid communication between the pressurizing device and the actuator, and wherein the diagnosing device includes a restricted-state determining portion operable to determine whether the pressurizing device is abnormal or not, on the basis of the hydraulic pressure detected while the fluid communication regulating device is placed in the restricted state.

The fluid communication regulating device is selectively placed in the open state for non-restricted fluid communication between the pressurizing device and the actuator, or in the restricted state for restricted fluid communication between the pressurizing device and the actuator. The restricted state may be a closed state for complete disconnection of the pressurizing device from the actuator, or a throttling state for partial restriction of fluid flows between the pressurizing device and the actuator.

While the fluid communication regulating device is placed in the open state, the fluid pressurized by the pressurizing device is supplied to the actuator. While the fluid communication regulating device is placed in the restricted state, the supply of the fluid pressurized by the pressurizing device to the actuator is restricted. The pressure of the fluid as pressurized by the pressurizing device can be detected by the hydraulic pressure detecting device with a higher degree of accuracy when the fluid communication regulating device is placed in the restricted state, than in the open state. In particular, an increase in the pressure of the fluid as pressurized by the pressurizing device can be detected without an influence of the actuator, when the pressure is detected while the fluid communication regulating device is placed in the closed state in which the pressurizing device is disconnected from the actuator. Namely, the hydraulic pressure detected by the hydraulic pressure detecting device accurately represents the fluid pressure as pressurized by the pressurizing device.

The actuator may be a wheel brake cylinder for operating a wheel brake for braking a wheel of the vehicle. The wheel brake cylinder need not be operated with the fluid pressurized by the pressurizing device while the brake operating member is not in operation. Accordingly, the complete disconnection of the pressurizing device from the wheel brake cylinder does not cause any inconvenience while the brake operating member is in the non-operated position.

The fluid communication regulating device may be provided exclusively for the purpose of diagnosing the pressurizing device, or may be a control valve provided for other purposes, such as a pressure control device provided for controlling the fluid pressure in the actuator.

(5) A diagnosing apparatus according to any one of the above modes (1)–(4), further comprising a first terminating device for terminating an operation of the diagnosing device when the brake operating member is operated during the operation of the diagnosing device.

If the diagnosis of the pressurizing device is continued by the diagnosing device even after the brake operating member is operated, the diagnosing device may suffer from an erroneous determination as to whether the pressurizing device is abnormal or not. To avoid this erroneous determination, the first terminating device terminates an operation of the diagnosing device when the brake operating member is operated. The first terminating device is therefore effective to improve the reliability or accuracy of the diagnosis.

(6) A diagnosing apparatus according to any one of the above modes (2)–(5), further comprising a second terminating device for terminating an operation of the diagnosing device when the running speed of the automotive vehicle detected by the vehicle speed detecting device has exceeded a predetermined second threshold value during the operation of the diagnosing device.

After the vehicle speed has exceeded the second threshold value, there is a risk that the brake operating member is operated during the diagnosis by the diagnosing device. In view of this risk, it is desirable to terminate the diagnosis when the vehicle speed has exceeded the second threshold value. It is also desirable to terminate the diagnosis for improving the safety of running of the vehicle.

The second threshold value may be equal to the first threshold value indicated above, or higher than the first threshold value.

(7) A diagnosing apparatus according to any one f the above modes (1)–(6), wherein the diagnosing device determines that the pressurizing device is abnormal, when the hydraulic pressure detected by the hydraulic pressure detecting device is lower than a threshold value determined by an operating condition of the pressurizing device.

In the diagnosing apparatus according to the above mode (7), the diagnosing device determines that the pressurizing device is abnormal, when the hydraulic pressure detected while the brake operating member is not in operation and while the pressurizing device is in operation is lower than the predetermined threshold value.

Where the pressurizing device is operated in a predetermined operating condition during the diagnosis thereof, the threshold value of the hydraulic pressure detected by the hydraulic pressure detecting device may be a predetermined fixed value. Where the operating condition of the pressurizing device during its diagnosis varies from time to time, the threshold value may be determined depending upon the operating condition of the pressurizing device.

(8) A diagnosing apparatus according to the above mode (7), wherein the diagnosing device includes a threshold determining device for determining the threshold value of the hydraulic pressure depending upon the operating condition of the pressurizing device.

The threshold determining device may be considered to include hydraulic pressure estimating means for estimating a pressure of the fluid pressurized by the pressurizing device, depending upon the operating condition of the pressurizing device. For instance, the diagnosing device may determine that the pressurizing device is abnormal, if the hydraulic pressure actually detected by the hydraulic pressure detecting-device is lower than the threshold value which is determined by the estimated pressure of the fluid pressurized by the pressurizing device. Where the pressurizing device includes a pump and an electric motor for operating the pump, the threshold value of the hydraulic pressure may be determined on the basis of the electric current flowing through the electric motor or the rotating speed of the electric motor, which current or rotating speed is an operating condition of the pressuring device. Where a pressure control valve is provided for controlling the pressure of the fluid pressurized by the pressurizing device, the threshold value may be determined on the basis of the operating condition of the pressure control valve, such as the amount of electric current applied to a solenoid coil of the pressure control valve or the duty ratio of the pressure control valve.

(9) A diagnosing apparatus according to any one of the above modes (1)–(8), wherein the diagnosing device includes a pressurizing-device control device for controlling the pressurizing device such that the pressurizing device is operated in a predetermined operating condition.

(10) A diagnosing apparatus according to any one of the above modes (1)–(9), wherein the diagnosing device determines whether the pressurizing device is abnormal or not, depending upon whether the brake operating member is operated within a predetermined time after the fluid communication regulating device is operated from the restricted state to the open state.

In the diagnosing apparatus according to the above mode (10), a brake operation detecting device may be provided for determining whether the brake operating member is in operation or not, such that the brake operating detecting device determines that the brake operating member is operated when an amount of operation of the brake operating member has exceeded a predetermined value. In this case, the fluid communication regulating device has a closed state as the restricted state, in which the pressurizing device is disconnected from the actuator. While the pressurizing device is disconnected from the actuator, the application of an operating force to the brake operating member may not cause the amount of operation of the brake operating member to exceed the predetermined value. In this event, the brake operating detecting device may determine that the brake operating member is not in operation while the brake operating member is in fact in operation. In view of this, it is reasonable to consider that when the brake operating member is operated within the predetermined time after the fluid communication regulating device is operated to the open state, the brake operating member was in operation even if the brake operation detecting device had once determined that the brake operating member was not in operation.

In the above case, the hydraulic pressure detected by the hydraulic pressure detecting device is considered to be the fluid pressure generated by operation of the brake operating member, and therefore the pressurizing device may be considered abnormal, even if the detected hydraulic pressure is higher than a predetermined threshold value above which the pressurizing device is considered normal.

The hydraulic pressure may be detected by the hydraulic pressure detecting device while the brake operating member is in operation. In this case, the detected hydraulic pressure is a sum of the first fluid pressure generated by an operation of the brake operating member and the second fluid pressure generated by an operation of the pressurizing device. This sum is compared with a predetermined nominal value of the sum which is estimated to be established while the pressurizing device is normal and while the brake operating member is operated with a predetermined operating force. In this case, the diagnosing device may determine that the pressurizing device is normal, when the detected sum is larger than the predetermined nominal value.

It is also possible that the diagnosing device does not determine whether the pressurizing device is abnormal or not, namely, the diagnosing device does not diagnose the pressurizing device, if the brake operating member is operated after the fluid communication regulating device is operated to the open state, since the hydraulic pressure detected by the hydraulic pressure detecting device includes the first fluid pressure generated by operation of the brake operating member.

(11) A diagnosing apparatus according to the above mode (10), wherein the fluid communication regulating device is provided in a portion of the fluid passage which connects the actuator and a master cylinder which is operatively connected to the brake operating member and which generates a fluid pressure corresponding to an operating condition of the brake operating member.

In the diagnosing apparatus according to the above mode (11), the fluid passage described above with respect to the diagnosing apparatus according to the above mode (10) has a portion which connects the actuator and the master cylinder and in which the fluid communication regulating device is provided. In the present embodiment, the hydraulic pressure detecting device is disposed so as to detect the fluid pressure in the above-indicated portion of the fluid passage.

While the fluid communication regulating device is placed in its restricted state, the application of the fluid pressure generated by the master cylinder to the actuator is restricted by the fluid communication regulating device, so that an operating force acting on the brake operating member may not cause an increase in the amount of operation (operating stroke) of the brake operating member by an amount exceeding a given threshold above which the brake operating member is considered to have been operated. When the fluid communication regulating device is switched to its open state, the fluid pressurized by the master cylinder can be supplied to the actuator through the regulating device in the open state, so that the amount of operation of the brake operating member exceeds the given threshold. The present arrangement is particularly effective where the fluid communication regulating device has a closed state, like a shut-off valve. In this closed state in which the hydraulic pressure is detected, the master cylinder is completely disconnected from the actuator, an operating force acting on the brake operating member will not cause the amount of operation of the brake operating member to increase by an amount exceeding the above-indicated threshold.

(12) A diagnosing apparatus according to any one of the above modes (4)–(11), wherein said diagnosing device includes a regulating device control device operable to operate the fluid communication regulating device from the restricted state to said open state when the hydraulic pressure detected by the hydraulic pressure detecting device indicates that the pressurizing device is normal.

In the diagnosing apparatus according to the above mode (12), the regulating-device control device operates the fluid communication regulating device to be placed in the open state, when the detected hydraulic pressure indicates that the pressurizing device is normal, for instance, when the detected hydraulic pressure is higher than the predetermined threshold value described above with respect to the above mode (7). In this respect, it is noted that when the detected hydraulic pressure indicates that the pressurizing device is abnormal, for instance, when the detected hydraulic pressure is lower than the predetermined threshold value indicated above, it is not necessary to check if the brake operating member was in operation when the hydraulic pressure was detected.

(13) A diagnosing apparatus according to any one of the above modes (1)–(12), wherein the diagnosing device determines whether the pressuring device is abnormal or not, on the basis of a plurality of values of the hydraulic pressure which are obtained by the hydraulic pressure detecting device when the pressurizing device is operated in respective different operating conditions.

In the diagnosing apparatus according to the above mode (13), the diagnosing device diagnoses the pressurizing device, on the basis of a plurality of hydraulic pressure values detected when the pressurizing device is operated in the respective different operating conditions, that is, on the basis of the two or more relationships between the different operating conditions of the pressurizing device and the hydraulic pressure values detected in the respective different operating conditions of the pressurizing device. This arrangement using the two or more hydraulic pressure values assures a higher degree of accuracy of the diagnosis of the pressuring device, than the arrangement using a single hydraulic pressure value.

The hydraulic pressure value or values detected by the hydraulic pressure detecting device while the brake operating member is not in operation corresponds to the specific operating condition of the pressurizing device. The operating condition of the pressurizing device is considered to be an output of the pressurizing device, which is determined by an input to the pressurizing device, which in turn is controlled by a control device. In the present diagnosing apparatus, therefore, it is possible to determine whether the relationship between the output and input of the pressurizing device is normal or not.

(14) A diagnosing apparatus according to the above mode (13), wherein said diagnosing device includes a first control portion for operating the pressurizing device in a predetermined first operating condition, and a second control portion for operating the pressurizing device in a predetermined second operating condition different from the predetermined first operating condition.

The diagnosing device may include more than three control portions including the first and second control portions indicated above. For instance, the diagnosing device includes a third and a fourth control portion as well as the first and second control portions.

Each diagnostic determination of the pressurizing device; may be based on the hydraulic pressure values detected during operations of the pressurizing device whose operating conditions are controlled by the respective two or more control portions. Alternatively, the control portions for controlling the operating conditions of the pressurizing device in one diagnostic determination of the pressurizing device may be different from those for controlling the operating conditions in another diagnostic determination of the pressurizing device.

(15) A diagnosing apparatus according to the above mode (13) or (14), wherein the diagnosing device includes a pressure data memory for storing values of the hydraulic pressure detected by the hydraulic pressure detecting device in the respective different operating conditions of the pressurizing device, the diagnosing device effecting diagnostic determinations at different times as to whether the pressurizing device is abnormal or not, such that a present one of the diagnostic determinations is effected on the basis of the plurality of values of the hydraulic pressure at least one of which is stored in the pressure data memory and was detected in another of the diagnostic determinations during an operation of the pressurizing device in the operating condition different from the operating condition in which the pressurizing device is operated to effect the present one of the diagnostic determinations.

Where the hydraulic pressure values are detected during operations of the pressurizing device in different operating conditions to effect each diagnostic determination as to whether the pressure device is normal or not, each diagnostic determination requires a comparatively long time. In the diagnosing apparatus according to the above mode (15), the present diagnostic determination is effected on the basis of the two or more hydraulic pressure values at least one of which is stored in the pressure data memory and was detected for another diagnostic determination during an operation of the pressurizing device in the operating condition different from the operating condition in which the pressurizing device is operated to effect the present diagnostic determinations. The present diagnostic apparatus requires a reduced time for effecting each diagnostic determination.

For instance, the pressurizing device is operated in two different operating conditions alternately to effect the two successive diagnostic determinations. In this case, the present diagnostic determination is made on the basis of the hydraulic pressure value detected for the last diagnostic determination and the hydraulic pressure value detected for the present diagnostic determination. Further, the plurality of values of the hydraulic pressure used for each diagnostic determination may include a hydraulic pressure value detected for a purpose other than the diagnostic purpose. In any case, it is desirable that the detected hydraulic pressure values be stored in the pressure data memory in relation to the operating conditions of the pressurizing device in which the hydraulic pressure values were detected.

(16) A diagnosing apparatus according to any one of the above modes (1)–(15), wherein the diagnosing device includes at least one of (a) a first determining portion operable to determine whether the pressurizing device is abnormal or not, on the basis of the hydraulic pressure detected by the hydraulic pressure detecting device while the pressurizing device is not in operation, and (b) a second determining portion operable to determine whether the pressurizing device is abnormal or not, on the basis of the hydraulic pressure detected by the hydraulic pressure detecting device while the brake operating member is in operation.

According to diagnosing apparatus according to the above mode (16), the pressurizing apparatus can be diagnosed on the basis of at least one of results of three diagnostic determinations which are effected (i) while the brake operating member is not in operation and while the pressurizing device is in operation, (ii) while the brake operating member and the pressurizing device are both in operation, and (iii) while the brake operating member is in operation and while the pressurizing device is not in operation. The diagnosing device may finally determine that the pressurizing device is abnormal, if any one of the three diagnostic determinations (i), (ii) and (iii) indicates an abnormality of the pressurizing device, or if the determinations (i) and (ii) or (iii) indicate an abnormality of the pressurizing device.

Thus, the apparatus according to the above mode (16) is capable of diagnosing the pressurizing device in a plurality of different conditions of the braking system, assuring an improved accuracy of the diagnosis and permitting a detailed analysis regarding the abnormality visavis the specific operating condition of the braking system.

(17) A diagnosing apparatus according to any one of the above modes (1)–(16), wherein the diagnosing device includes a multiple phase determining portion for determining whether the pressurizing device is abnormal or not, on the basis of at least two relationships each of which is a relationship among at least two physical quantities selected from the group consisting of a quantity indicative of an operating condition of said pressurizing device; the hydraulic pressure detected by the hydraulic pressure detecting device; and a deceleration value of an automotive vehicle on which the hydraulically operated braking system is provided.

In the diagnosing apparatus according to the above mode (17), the diagnosis of the pressurizing device is based on at least two relationships selected from the following four relationships: a relationship between the detected hydraulic pressure and the quantity indicative of the operating condition of the pressurizing device; a relationship between the detected hydraulic pressure and the vehicle deceleration value; a relationship among the detected hydraulic pressure, the quantity indicative of the operating condition and the vehicle deceleration value; and a relationship between the quantity indicative of the operating condition and the vehicle deceleration value.

While the brake operating member is not in operation and while the pressurizing device is in operation, each of the above indicated four relationships among the physical quantities is known. For instance, the quantity indicative of the operating condition of the pressurizing device (which quantity is considered an input of the pressurizing device) and the detected hydraulic pressure generated by the pressurizing device (witch pressure is considered an output of the pressurizing device) have a known nominal or desired relationship. While the braking system is operated with an operation of the pressurizing device, the deceleration value of the vehicle increases with an increase in the pressure of the fluid pressurized by the pressurizing device, that is, with an increase in the detected hydraulic pressure. Accordingly, the pressurizing device can be diagnosed on the basis of the at least two relationships among the at least two physical quantities selected from the three physical quantities indicated above.

Where the actuator described above with respect to the above mode (14) is a wheel brake cylinder for operating a wheel brake for braking a vehicle wheel, the fluid communication regulating device is preferably placed in the open state when the pressurizing device is diagnosed on the basis of the above indicated relationships. In this respect, it is noted that the pressurized fluid is preferably supplied to the wheel brake cylinder, in order to detect the vehicle deceleration value.

(18) A diagnosing apparatus for diagnosing a pressurizing device provided in a hydraulically operated braking system operated by a brake operating member, the diagnosing apparatus comprising:

a hydraulic pressure detecting device operable to detect a hydraulic pressure which is a sum of a first fluid pressure generated by an operation of the brake operating member and a second fluid pressure generated by an operation of the pressurizing device; and a diagnosing device operable to determine whether the pressurizing device is abnormal or not, on the basis of at least two hydraulic pressures selected from the group consisting of (a) the hydraulic pressure detected the hydraulic pressure detecting device while the brake operating member is not in operation and while the pressurizing device is in operation, (b) the hydraulic pressure detected by the hydraulic pressure detecting device while the brake operating member and the pressurizing device are both in operation, and (c) the hydraulic pressure detected by the hydraulic pressure detecting device while the brake operating member is in operation and while the pressurizing device is not in operation.

The diagnosing apparatus according to the above mode (18) of this invention may further include a feature according to any one of the above modes (1)–(17).

(19) A diagnosing apparatus for diagnosing a pressurizing device provided in a hydraulically operated system operated by a brake operating member, the diagnosing apparatus comprising:

a hydraulic pressure detecting operable to detect a hydraulic pressure which is a sum of a first fluid pressure generated by an operation of the brake operating member and a second fluid pressure generated by an operation of the pressurizing device; and a diagnosing device operable to determine whether the pressurizing device is abnormal or not, on the basis of at least two relationships each of which is a relationship among at least two physical quantities selected from the group consisting of: a quantity indicative of an operating condition of the pressurizing device; the hydraulic pressure detected by the hydraulic pressure detecting device; and a deceleration value of an automotive vehicle on which the hydraulically operated braking system is provided.

The operating condition of the pressuring device indicated above includes the non-operated state as well as the operated state. The hydraulic pressure and the deceleration value indicated above may be detected while the brake operating member is in operation or while it is not in operation, and while the pressurizing device is in operation or while it is not in operation.

The diagnosing apparatus according to the above mode (19) may further includes a feature according to any one of the above modes (1)–(18).

(20) A diagnosing apparatus according to any one of the above modes (1)–(19), wherein the hydraulically operated braking system has a plurality of fluid passages extending from the pressurizing device, and the hydraulic pressure detecting device includes a plurality of pressure sensors connected to the plurality of fluid passages, respectively, the diagnosing device determining whether said pressuring device is abnormal or not, on the basis of a difference between values of the hydraulic pressure detected by said plurality of pressure sensors.

In the diagnosing apparatus according to the above mode (20), the pressure detecting device includes two or more pressure sensors, and the diagnosing device is arranged to diagnose the pressurizing device also on the basis of a difference of the two or more values of the hydraulic pressure detected by the two or more pressure sensors. This arrangement assures a higher degree of accuracy of diagnosis of the pressurizing device, than the arrangement wherein the diagnosis is made on the basis of the hydraulic pressure detected by a single pressure sensor.

Where the braking system is adapted such that the fluid pressures in the plurality of fluid passages are equal to each other, the pressurizing device is considered to be abnormal if the difference of the hydraulic pressure values detected by the plurality of pressure sensors is larger than a predetermined threshold. Where the braking system is adapted such that the fluid pressures in the fluid passages have a predetermined nominal difference, the pressurizing device is considered to be abnormal if the difference of the hydraulic pressure values detected by the pressure sensors is larger than the predetermined nominal difference by more than a predetermined amount.

The pressurizing device may have a single pressurizing portion or a plurality of pressurizing portions. Where the fluid passages extend from the plurality of pressurizing portions, at least one of the pressurizing portions is considered to be abnormal, if the hydraulic pressure values detected by the respective pressure sensors provided for the respective fluid passages have a difference larger than a predetermined threshold, while the pressurizing portions are operated in the same operating condition.

The pressuring device may include a single pressurizing portion from which a plurality of fluid passages extend, and a plurality of fluid communication regulating devices which are connected to respective fluid passages and each of which has an open state for non-restricted fluid flows through the corresponding fluid passage and a restricted state for restricted fluid flows through the corresponding fluid passages. If a difference of the hydraulic pressure values detected by the pressure sensors while the fluid communication regulating devices are placed in the restricted state is larger than a predetermined threshold, at least one of the fluid communication regulating devices is considered to be abnormal.

(21) A diagnosing apparatus for diagnosing a first pressuring device and a second pressurizing device provided in a hydraulically operated braking system which includes (1) a master cylinder having two pressurizing chambers and operable by a brake operating member to generate in the two pressurizing chambers a hydraulic pressure corresponding to an operating force acting on the brake operating member, (2) a first group of brake cylinders connected to a first fluid passage extending from one of the two pressurizing chambers, and a second group of brake cylinders connected to a second fluid passage extending from the other of the two pressurizing chambers, and (3) the first and second pressurizing devices operable to deliver a pressurized fluid through the first and second fluid passages, respectively, while the brake operating member is not in operation, characterized by comprising:

a first and a second pressure detecting device connected to the first and second fluid passages, respectively; and a diagnosing device operable to determine whether at least one of the first and second pressurizing devices is abnormal or not, on the basis of a difference between hydraulic pressure values detected by the first and second hydraulic pressure detecting devices while the brake operating member is not in operation and while the first and second pressurizing devices are operated in the same operating condition.

Where the hydraulically operated braking system is an automotive vehicle braking system of diagonal or X-cross type having two brake application sub-systems, the first group of brake cylinders consists of a front right wheel brake cylinder and a rear left wheel brake cylinder for braking a front right wheel and a rear left wheel of the vehicle, respectively, while the second group of brake cylinders consists of a front left wheel brake cylinder and a rear right wheel brake cylinder for braking a front left wheel and a rear right wheel of the vehicle, respectively. The first hydraulic pressure detecting device is connected to the first fluid passage which connects the first group of brake cylinders to one of the two pressurizing chambers of the master cylinder, while the second hydraulic pressure detecting device is connected to the second fluid passage which connects the second group of brake cylinders and the other pressurizing chamber. In the diagonal type braking system, the hydraulic pressures in the first and second fluid passages are normally equal to each other. If a difference between the hydraulic pressures in the first and second fluid passages is larger than a predetermined threshold value, at least one of the first and second pressurizing devices is considered to be abnormal.

The diagnosing apparatus according to the above mode (21) may include a feature according to any one of the above modes (1)–(29).

(22) A diagnosing apparatus according to any one of the above modes (1)–(21), wherein the pressurizing device (or each of the first and second pressurizing devices) includes a pump for pressurizing a working fluid, and a pump motor for operating the pump.

As described in detail in the DETAILED DESCRIPTION OF THE PREFERRED EMBODIMENTS, the pump may be adapted to pressurize the fluid stored in or delivered from the master cylinder, or alternatively pump up the fluid from a reservoir which stores the fluid at the atmospheric pressure.

In the diagnosing apparatus according to the above mode (22), the operating condition of the pressurizing device is determined by the operating condition of the pump, which can be controlled by controlling the operating condition of the pump motor

(23) A diagnosing apparatus according to any one of the above modes (1)–(22), wherein the pressurizing device (each of the first and second pressurizing devices) includes a solenoid-operated pressure control valve for controlling a pressure of a working fluid pressurized by the pressurizing device.

In the diagnosing apparatus according to the above mode (23), the operating condition of the pressurizing device is determined by the operating condition of the solenoid-operated pressure control valve, and can be controlled by controlling an electric current applied to a solenoid coil of the pressure control valve.

(24) A diagnosing apparatus for diagnosing a pressurizing device provided in a hydraulically operated braking system which is operated by a brake operating member and which includes a master cylinder having a pressurizing piston which is advanced by a drive force produced by the pressurizing device and an operating force applied to the brake operating member and which partially defines a pressurizing chamber, the diagnosing apparatus comprising:
- a master cylinder pressure detecting device operable to detect a hydraulic pressure in the pressurizing chamber of the master cylinder; and
- a diagnosing device operable to determine whether the pressurizing device is abnormal or not, on the basis of the hydraulic pressure detected by the master cylinder pressure detecting device while the brake operating member is not in operation and while the pressurizing device is in operation.

The diagnosing apparatus according to the above mode (24) will be described in detail as the first embodiment of this invention in the DESCRIPTION OF THE PREFERRED EMBODIMENTS. While the brake operating member is not in operation, no operating force of the brake operating member is applied to the pressurizing piston of the master cylinder, and only the drive force based on the fluid pressure generated by the pressurizing device is applied to the pressurizing piston, so that the fluid pressure in the pressurizing chamber of the master cylinder corresponds to the drive force produced by the pressurizing device.

The master cylinder pressure detecting device may be adapted to directly detect the pressure of the fluid in the pressurizing chamber of the master cylinder, or detect the fluid pressure at a portion of the braking system which communicates with the pressurizing chamber.

The diagnosing apparatus according to the above mode (24) may include a feature according to any one of the above modes (1)–(23).

(25) A diagnosing apparatus according to the above mode (24), wherein the pressurizing piston of the master cylinder partially define a front pressurizing chamber as the pressurizing chamber on one of opposite sides thereof, and a rear pressurizing chamber on the other of the opposite sides thereof, the pressurizing device being connected to the rear pressurizing chamber.

When the brake operating member is operated, the pressurizing piston is advanced to increase the fluid pressure in the front pressurizing chamber. When the pressurizing device is operated, the fluid pressure in the rear pressurizing chamber is increased, so that the pressurizing piston is advanced to increase the fluid pressure in the front pressurizing chamber. Accordingly, the fluid pressure in the front pressuring chamber is a sum of the fluid pressure generated by an operation of the brake operating member and the fluid pressure generated by an operation of the pressurizing device.

(26) A diagnosing apparatus for diagnosing a pressurizing device provided in a hydraulically operated braking system which is operated by a brake operating member and which includes a master cylinder adapted to generate a hydraulic pressure corresponding to an operating force acting on said brake operating member, the pressurizing device being operable to pressurize a working fluid received from the master cylinder so that the pressurized fluid is delivered through a fluid passage extending from the master cylinder, the diagnosing apparatus comprising:
- a hydraulic pressure detecting device connected to the fluid passage;
- a fluid communication regulating device provided in the fluid passage and having an open state for non-restricted fluid communication of the hydraulic pressure detecting device and the pressurizing device with the master cylinder, and a restricted state for restricted fluid communication of the hydraulic pressure detecting device and the pressurizing device with the master cylinder; and
- a diagnosing device operable to determine whether the pressurizing device is abnormal or not, on the basis of a hydraulic pressure detected by the hydraulic pressure detecting device while the brake operating member is not in operation, while the fluid communication regulating device is placed in the restricted state, and while the pressurizing device is in operation.

The diagnosing apparatus according to the above mode (26) will be described in detail as the fourth and fifth embodiments of the invention in the DETAILED DESCRIPTION OF THE PREFERRED EMBODIMENTS. While the brake operating member is not in operation, no fluid pressure is generated in the master cylinder by the brake operating member. In this condition, the pressure of the fluid in the master cylinder which is to be pressurized by the pressurizing device is substantially equal to the atmospheric pressure. Accordingly, the hydraulic pressure detected by the hydraulic pressure detecting device is the pressure which corresponds to the operating condition of the pressurizing device.

While the fluid communication regulating device is placed in the restricted state, the fluid communication of the hydraulic pressure detecting device and the pressurizing device with the master cylinder is restricted while no fluid pressure is generated by the master cylinder by the brake operating member, so that the flow of the pressurized fluid from the pressurizing device to the master cylinder is restricted. Accordingly, the hydraulic pressure as detected by the hydraulic pressure detecting device accurately represents the operating condition of the pressurizing device, whereby the reliability or accuracy of diagnosis of the pressurizing device is improved. While the fluid communication regulating device is placed in the closed state, the flow of the pressurized fluid from the pressurizing device to the master cylinder is inhibited, so that the accuracy of the diagnosis cam be further improved. The closed state is considered as one form of the restricted state.

The diagnosing apparatus according to the above mode (26) may include a feature according to any one of the above modes (1)–(25).

(27) A diagnosing apparatus for diagnosing a pressurizing device provided in a hydraulically operated braking system which includes a brake operating member and a master cylinder adapted to generate a hydraulic pressure corresponding to an operating force acting on the brake operating member, the pressurizing device being operable to pressurize a working fluid so that the pressurized fluid is delivered through a fluid-passage extending from the master cylinder, characterized by comprising:
- a hydraulic pressure detecting device connected to the fluid passage;
- a fluid communication regulating device provided in the fluid passage and having an open state for non-restricted fluid communication of the hydraulic pressure detecting device and the pressurizing device with the master cylinder, and a restricted state for restricted fluid communication of the hydraulic pressure detecting device and the pressurizing device with the master cylinder; and a diagnosing device operable to determine whether the pressurizing device is abnormal or not, on the basis of a hydraulic pressure detected by the hydraulic pressure detecting device while the brake operating member is not in operation, while the fluid communication regulating device is placed in the restricted state, and while the pressurizing device is in operation.

In the diagnosing apparatus according to the above mode (27), the pressurizing device may be adapted to pressurize the fluid received from the master cylinder or from a reservoir which stores the fluid at a pressure substantially equal to the atmospheric pressure, or pressurize the fluid received from a selected one of the master cylinder and the reservoir. In any of the above cases, the pressurizing device is diagnosed on the basis of the hydraulic pressure detected by the hydraulic pressure detecting device while the brake operating member is not in operation.

The pressurizing device may be connected to the pressurizing chamber of the master cylinder so that the fluid pressurized by the pressurizing chamber is delivered through the pressurizing chamber of the master cylinder and the fluid passage. Alternatively, the pressurizing chamber may be connected directly to the fluid passage so that the fluid pressurized by the pressurizing device is delivered through the fluid passage, without passing the pressurizing chamber.

The diagnosing apparatus according to the above mode (27) may include a feature according to any one of the above modes (1)–(25).

(28) A hydraulically operated braking system comprising:
a pressurizing device for delivering a pressurized fluid to a brake cylinder;
a pressure control device including a control data memory which stores a nominal relationship between an operating condition of the pressurizing device and the pressure of the fluid pressurized by the pressurizing device, the pressure control device further including a control portion for controlling the pressurizing device according to the nominal relationship stored in the control data memory, to thereby control the pressure in the brake cylinder; and
a diagnosing apparatus operable to determine whether the pressurizing device is abnormal or not, on the basis of pressure values of the fluid pressurized by the pressurizing device, which pressure values are detected while the pressurizing device is operated in a plurality of different operating conditions, and wherein the pressure control device includes a control data compensating portion operable when the diagnosing apparatus determines that the pressurizing device is normal, the control data compensating portion compensating the nominal relationship on the basis of the pressure values detected by the hydraulic pressure detecting device when the diagnosing apparatus has determined that the pressurizing device is normal.

In the hydraulically operated braking system according to the above mode (28) of this invention, the stored nominal relationship between the operating condition of the pressurizing device and the pressure of the fluid pressurized by the pressurizing device is compensated on the basis of the pressure values detected when the diagnosing apparatus has determined that the pressurizing device is normal. The pressure of the fluid pressurized by the pressurizing device operated in a given operating condition may vary due to a chronological change and the operating environment of the pressurizing device. In the present braking system, the control data compensating portion of the pressure control device is effective to reduce a variation in the fluid pressure generated by the pressurizing device for thereby reducing the deterioration of control accuracy of the braking pressure of the brake cylinder, since the control data compensating portion is adapted to compensate or the presently stored nominal relationship between the operating condition and the output pressure of the pressurizing device on the basis of the pressure values detected upon determination that the pressurizing device is normal,

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIGS. 2A and 2B are schematic views showing a pressure control valve included in the braking system of FIG. 1;

Figure 14:
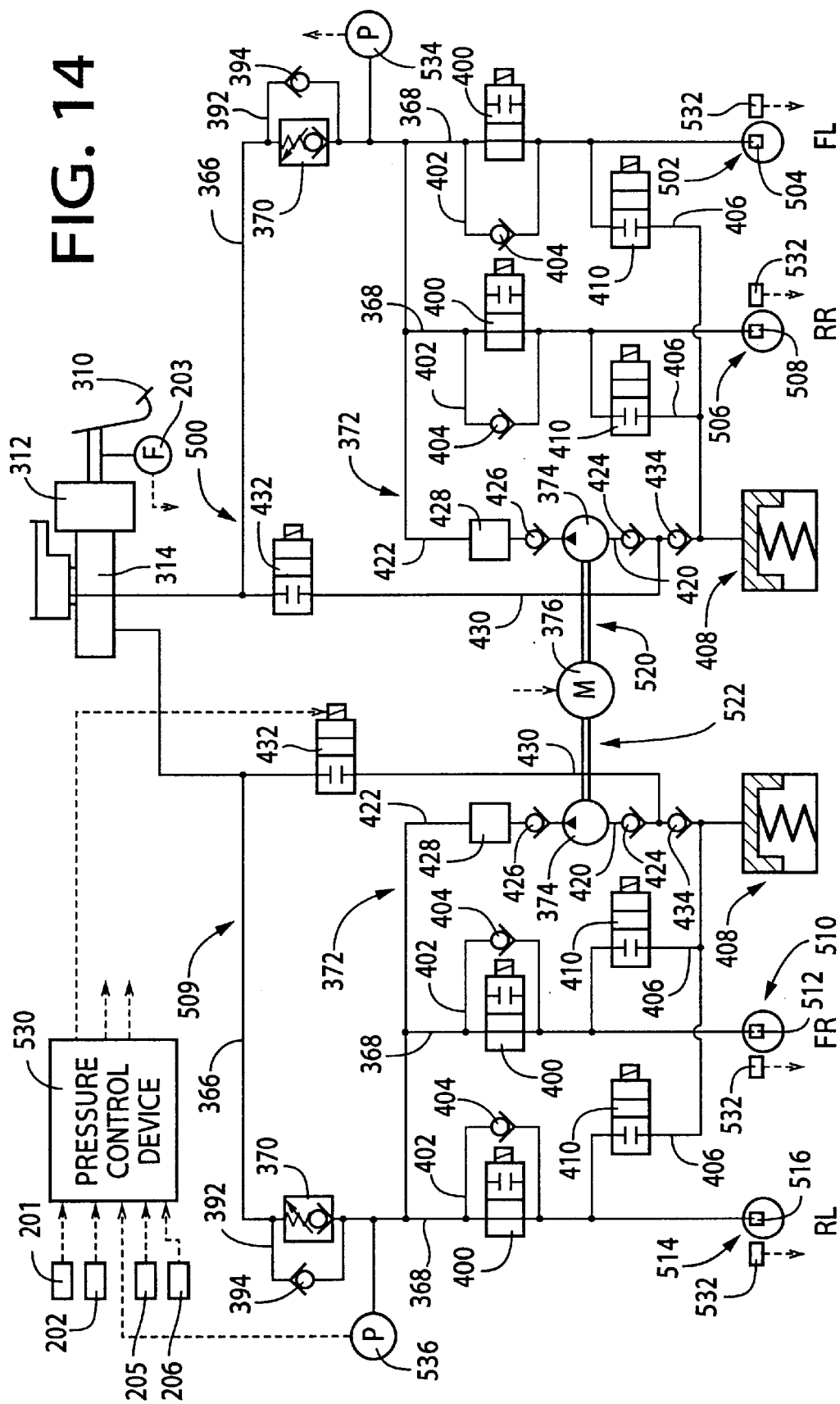
Figure 15:
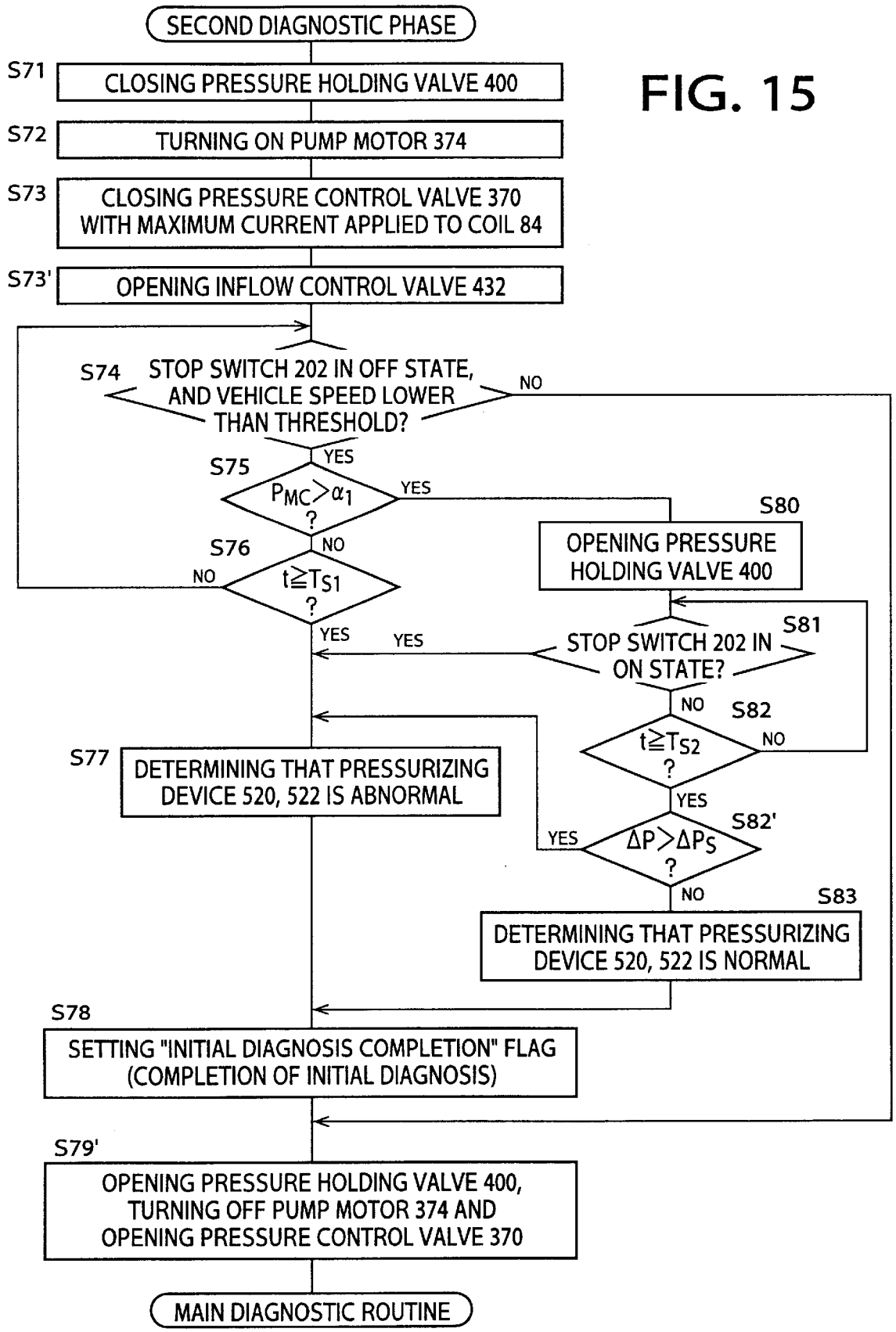

FIG. 14 is a schematic view showing a hydraulically operated braking system an abnormality of which can be detected by a diagnosing apparatus constructed according to a fifth embodiment of the present invention; and FIG. 15 is a flow chart illustrating a portion of an initial checking routine executed according to a control program stored in a ROM of a pressure control device of the braking system of FIG. 14, which pressure control device serves as a major portion of the diagnosing apparatus.

DETAILED DESCRIPTION OF THE PREFERRED EMBODIMENTS

Referring the accompanying drawings, several presently preferred embodiments of this invention will be described in detail.

Figure 1:
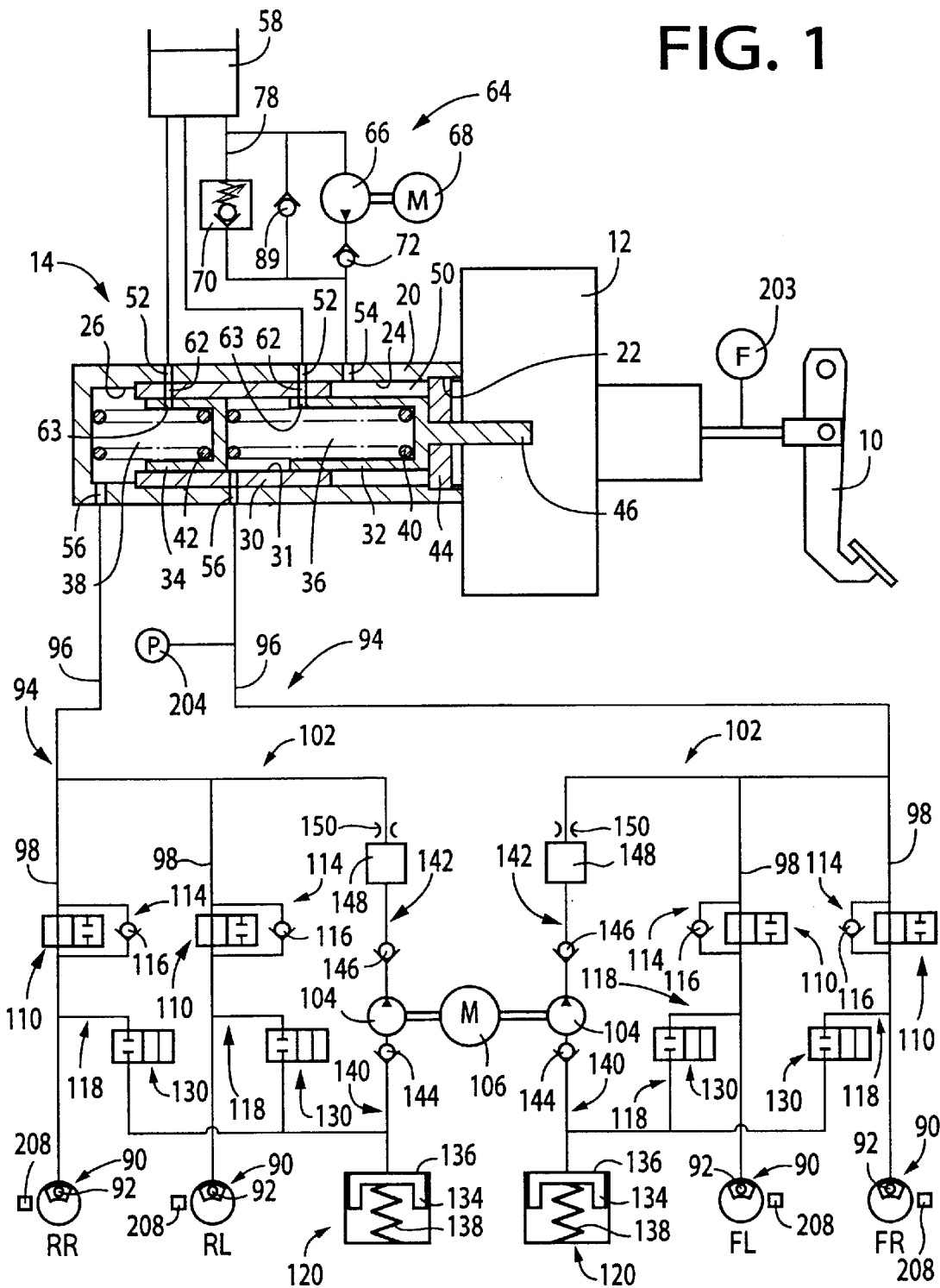
FIG. 1 is a schematic view showing a hydraulically operated braking system including a pressurizing device an abnormality of which can be detected by a diagnosing apparatus constructed according to a first embodiment of this invention.

Reference is first made to FIG. 1 showing a hydraulic operated braking system for an automotive vehicle, which includes a pressurizing device an abnormality of which can be detected by a diagnosing apparatus constructed according to a first embodiment of the present invention. This braking system includes a brake operating member in the form of a brake pedal 10, a vacuum booster 12 (hereinafter referred to simply as "booster 12") operatively connected to the brake pedal 10, and a master cylinder 14 of tandem type operatively connected to the booster 12.

The booster 12 has a negative-pressure chamber, and a variable-pressure chamber which is communicated selectively with the negative-pressure chamber and the atmosphere. The booster 12 includes a power piston which is operated by a force based on a difference between the pressures in the negative-pressure chamber and the variable-pressure chamber, as well known in the art. An operating force acting on the brake pedal 10 is boosted into an output force of the power piston of the booster 12, which is received, by the master cylinder 14.

The master cylinder 14 has a cylindrical housing 20 which is closed at one of its opposite axial ends and is open at the other axial end. The housing 20 has a first, a second and third cylindrical bore 22, 24, 26 formed therein such that these cylindrical bores are arranged in the axial direction from the open end towards the closed end. These cylindrical bores 22, 24, 26 have respective different diameters. Namely, the diameter of the bore 22 is larger than that of the bore 24, which is larger than that of the bore 26.

Within the second cylindrical bore 24, there is substantially fluid-tightly received a sleeve 30 which is held at a predetermined position by a suitable retainer member such as a retainer ring, such that one of the opposite axial end faces of the sleeve 30 which is nearer to the closed axial end of the housing 20 is kept in contact with an annular shoulder surface between the second and third cylindrical bores 24, 26. The sleeve 30 has an inner cylindrical surface defining a cylindrical bore 31 in which are fitted a first pressurizing piston 32 and a second pressurizing piston 34 in series with each other. Each of these two pressurizing pistons 32, 34 is a cylindrical member which is closed at one of its axial ends and open at the other end. The pressurizing pistons 32, 34, which are substantially fluid-tightly and slidably fitted in the bore 31, cooperate with the sleeve 30 and the housing 20 to define a first front pressurizing chamber 36 in front of a bottom wall at the closed end of the first pressurizing piston 32, and a second front pressurizing chamber 38 in front of a bottom wall at the closed end of the second pressurizing piston 34. That is, the bottom walls of the pressurizing pistons 32, 34 have inner surfaces which partially define the first and second front pressurizing chambers 36, 38, respectively.

Within the first and second front pressurizing chambers 36, 38, there are disposed respective two elastic members in the form of springs 40, 42, which bias the first and second pressurizing pistons 32, 34 towards their fully retracted positions of FIG. 1. An initial length (or maximum length of elongation) and an initial load of the spring 40 are determined by a suitable member (not shown), and the fully retracted position of the first pressurizing piston 32 is determined by a closure member 44 which will be described. The fully retracted position of the second pressurizing piston 34 is determined by the predetermined initial length and load of the spring 40 and the fully retracted position of the first pressurizing piston 32.

Within the first cylindrical bore 22, there is substantially fluid-tightly received the above-indicated closure member 44, whereby the housing 20 is substantially fluid-tightly closed at its open end. The fully advanced position of the closure member 44 on the side of the closed end of the housing 20 is determined by an abutting contact of the closure member 44 with an annular shoulder surface between the first and second cylindrical bores 22, 24. On the other hand, the fully retracted position of the closure member 44 is determined by a suitable retainer member such as a retainer ring, so that a removal of the closure member 44 from the housing 20 is prevented. As indicated above, the fully retracted position of the first pressurizing piston 32 is determined by its abutting contact of the closure member 44.

The first pressurizing piston 32 has an auxiliary piston 46 extending rearwardly from its rear end face, more precisely, from the rear end face of the bottom wall which partially defines the first front pressurizing chamber 36. The auxiliary piston 46 substantially fluid-tightly and slidably extends through the closure member 44 into the interior of the booster 12. The master cylinder 14 receives the output force of the power piston of the booster 12 through the auxiliary piston 46, so that hydraulic pressures which are substantially equal to each other are generated in the two front pressurizing chambers 36, 38.

The closure member 44 cooperates with the housing 20, the sleeve 30 and the first pressurizing piston 32 to define a rear pressurizing chamber 50 between the closure member 44 and the sleeve 30. A hydraulic pressure generated in this rear pressurizing chamber 50 acts on the first pressurizing piston 32 in the forward direction, causing a hydraulic pressure to be generated in the first front pressuring chamber 36. The hydraulic pressure in the first pressurizing chamber 36 acts on the second pressurizing piston 34 in the forward direction, causing a hydraulic pressure to be generated in the second front pressurizing chamber 38.

The housing 20 has two reservoir ports 52, one pressure-increasing port 54, and two brake cylinder ports 56.

The two reservoir ports 52 are provided for communication of the respective two front pressurizing chambers 36, 38 with a reservoir 58 that is provided to store a working fluid at the atmospheric pressure. The two reservoir ports 52, which are provided corresponding to the respective two pressurizing pistons 32, 34, communicate with the respective front pressurizing chambers 36, 38 through respective two communication passages 62 formed through the sleeve 30 in the radial direction, and respective two communication passages 63 formed through the respective pressurizing pistons 32, 34 held at their fully retracted positions of FIG. 1.

When each pressurizing piston 32, 34 is advanced a small distance from its fully retracted position, the corresponding communication passage 63 is closed by portions of the inner circumferential surface 31 of the sleeve 30 which are located on the front side of the corresponding communication hole 62, so that the communication passage 63 is disconnected from the corresponding reservoir port 52. In this condition, the hydraulic pressure in each front pressurizing chamber 36, 38 can be raised by an advancing movement of the corresponding pressurizing piston 32, 34.

The single pressure-increasing port 54 is formed through an axial portion of the housing 20 which partially defines the rear pressurizing chamber 50, and is provided for communication of the rear pressurizing chamber 50 with the pressurizing device 64. The pressurizing device 64 includes a pressure-increasing pump 66 of gear type, a pump motor 68 for driving the pressure-increasing pump 66, and a pressure control valve 70, which is a linear solenoid valve. The pressure-increasing pump 66 is connected on its suction side to the reservoir 58 and on its delivery side to the pressure-increasing port 54. The working fluid in the reservoir 58 is pumped up and pressurized by the pump 66, and the pressurized fluid is supplied to the rear pressurizing chamber 50. A check valve 72 is provided between the delivery side of the pump 66 and the pressure-increasing port 54, to prevent a flow of the fluid in the direction from the port 54 towards the pump 66.

The pressure control valve 70, which is provided to electromagnetically control the hydraulic pressure in the rear pressurizing chamber 50, is disposed in a fluid passage 78 connecting the rear pressurizing chamber 50 and the reservoir 58. As shown in FIGS. 2A and 2B, the pressure control valve 70 includes a housing, a valve member 80, a valve seat 82, and a coil 84 for generating a magnetic force which acts on the valve member 80 in a direction for moving the valve member 80 to be seated on the valve seat 82. With the valve member 80 being seated on and unseated from the valve seat 82, a flow of the fluid through the fluid passage 78 is controlled.

The pressure control valve 70 further includes a spring 86 for biasing the valve member 80 so as to be spaced apart from the valve seat 82. The pressure control valve 70 further includes an armature 88 disposed radially inwardly of a winding of the coil 84. The valve member 80 is movable with the armature 88. When the coil 84 is in a de-energized or off state of FIG. 2A, the valve member 80 is held apart from the valve seat 82, permitting bidirectional flows of the fluid between the rear pressurizing chamber 50 and the reservoir 58. In this off state of the pressure control valve 70, a change in the volume of the rear pressurizing chamber 50 as a result of an advancing movement of the first pressurizing piston 32 upon operation of the brake pedal 10 will cause the fluid to flow between the rear pressurizing chamber 50 and the reservoir 58.

When the coil 84 is in an energized or on state of FIG. 2B, the armature 88 is moved with a magnetic force F1 generated by the energized coil 84, in a direction that causes the valve member 80 to be seated on the valve member 82. At this time, the valve member 80 receives the magnetic force F1 acting thereon in the direction towards the valve seat 82, a force F2 based on a pressure difference across the pressure control valve 70, and an elastic force F3 of the spring 86, as indicated in FIG. 2B. The pressure difference indicated above is a difference between the pressure in the rear pressurizing chamber 50 and the pressure in the reservoir 58. Since the pressure in the reservoir 58 is substantially equal to the atmospheric pressure, the pressure difference is determined by the pressure in the rear pressurizing chamber 50. The magnetic force F1 acts on the valve member 80 in the direction towards the valve seat 82, while a sum of the force F2 and the elastic force F3 acts on the valve member 82 in the reverse direction. The position of the valve member 80 relative to the valve seat 82 and therefore the pressure in the rear pressurizing chamber 50 are determined by the forces F1, F2 and F3.

When the force F2 corresponding to the pressure in the rear pressurizing chamber 50 is equal to or smaller than a difference between the magnetic force F1 and the elastic force F3, that is, when a formula F2$\leq$F1–F3 is satisfied, the valve member 80 is seated on the valve seat 82, as shown in FIG. 2B, namely, the pressure control valve 70 is closed, so that the pressure control valve 70 pressurized fluid delivered from the pressure-increasing pump 66 flows into the rear pressurizing chamber 50, causing an increase in the pressure in the rear pressurizing chamber 50.

When the force F2 corresponding to the pressure in the rear pressurizing chamber is larger than the difference (F1–F3), that is, when a formula F2>F1–F3 is satisfied, the valve member 80 is moved away from the valve seat 82, as shown in FIG. 2A, namely, the pressure control valve 70 is opened, so that the pressurized fluid is discharged from the rear pressurizing chamber 50 into the reservoir 58 through the pressure control valve 70 in the open position, causing a decrease in the pressure in the chamber 50. The magnetic force F1 linearly increases with an increase in the amount of electric current I to be applied to the coil 84. If the elastic force F3 of the spring 86 is ignored, the Hydraulic pressure in the rear pressurizing chamber 50 is linearly increased with an increase in the amount of electric current I.

In view of the above, the fluid passage 78 may be referred to as a "pressure-reducing fluid passage", and the pressure control valve 70 may be referred to as a "pressure-reducing valve". By controlling the pressure control valve 70, a flow of the fluid from the rear pressurizing chamber 50 towards the reservoir 58 can be controlled, so that the hydraulic pressure in the rear pressurizing chamber 50 can be reduced. With the hydraulic pressure in the chamber 50 being reduced, the first pressurizing piston 32 is moved towards its fully retracted position, so that a fluid pressure in wheel brake cylinders 92 (which will be described is reduced.

Referring back to FIG. 1, there is provided a by-pass passage which by-passes both the pressure-increasing pump 66 and the pressure control valve 70 and which is provided with a check valve 89 which permits a flow of the fluid in a direction from the reservoir 58 towards the rear pressurizing chamber 50, but inhibits a flow of the fluid in the reverse direction. This check valve 89 as well as the pressure control valve 70 in the open position permits the fluid to flow from the reservoir 58 towards the rear pressurizing chamber 50, and therefore assures a rapid supply of the fluid into the rear pressurizing chamber 50 when the volume of the chamber 50 is rapidly increased as a result of a rapid operation of the brake pedal 10, whereby the provision of the check valve 89 prevents a negative pressure to be developed in the rear pressurizing chamber 50 upon the rapid operation of the brake pedal 10 for abrupt application of a brake to the vehicle. It is noted, however, that the above-indicated by-pass passage and check valve 89 are not essential, since the pressure control valve 70 is normally held in the open position.

The two brake cylinder ports 56 are formed through respective axial portions of the housing 20 which partially define the respective first and second front pressurizing chambers 36, 38. The two brake cylinder ports 56 are provided for communication of the pressurizing chambers 36, 38 with respective two mutually independent brake application sub-systems which corresponds to respective front and rear wheel pairs FL, FR, and RL, RR. One of the two brake application sub-systems includes a pair of front wheel brakes 90 for the front wheels FL, FR, while the other brake application sub-system includes a pair of rear wheel brakes 90 for the rear wheels RL, RR. The front wheel brakes 90 include respective front wheel brake cylinders 92, while the rear wheel brakes 90 include respective rear wheel brake cylinders 92. Since the two brake application sub-systems are identical in construction with each other, only the front brake application sub-system for the front wheels FL, FR will be described. The description of this front broke application sub-system applies to the rear brake application sub-system for the rear wheels RL, RR.

The first front pressuring chamber 36 of the master cylinder 14 is connected to the front wheel brake cylinders 92 for the front left and right wheels FL, FR, through a main fluid passage 94. The main fluid passage 94 consists of a common passage 96 extending from the first front pressurizing chamber 36, and two branch passages 98, 98 each of which is connected at one end thereof to the common fluid passage 96 and at the other end to respective two front wheel brake cylinders 92. A pump passage 102 is connected at one end thereof to the main fluid passage 94, and at the other end to a reservoir 120 (which will be described. To the pump passage 102, there is connected an anti-lock pressure control pump 104, which is driven by a pump motor 106. The pump motor 106 is also used to drive an anti-lock pressure control pump 104 provided in the rear brake application sub-system.

Figure 4:
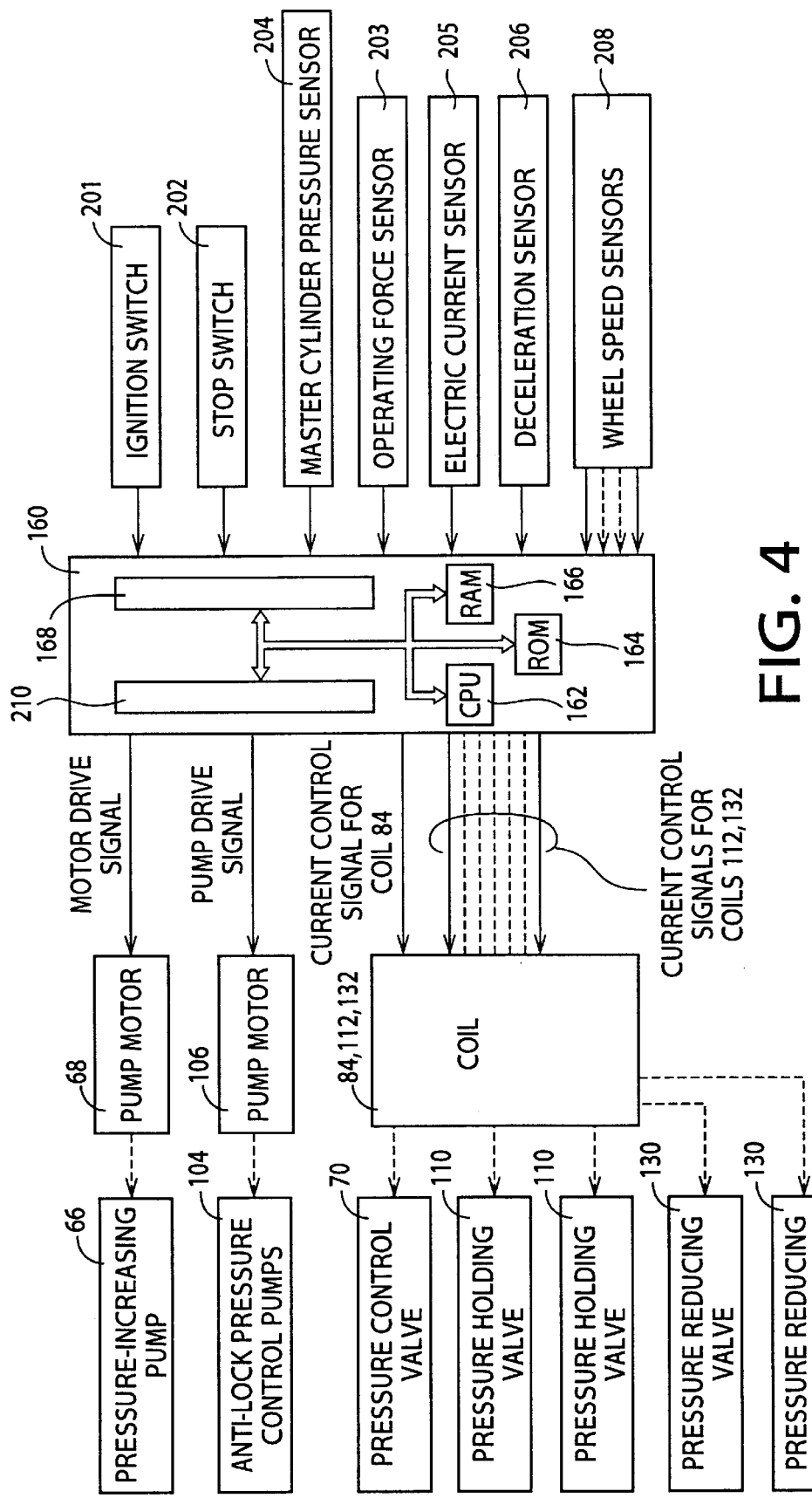
FIG. 4 is a block diagram illustrating an electric control system for the braking system, which includes a pressure control device and which serves as a major portion of the diagnosing apparatus, and various electrically controlled elements connected to the pressure control device.

In a portion of each branch passage 98 between the wheel brake cylinder 92 and a point of connection of the branch passage 98 to the pump passage 102, there is provided a normally open solenoid-operated shut-off valve in the form of a pressure-holding valve 110 having a coil 112 (FIG. 4). When the coil 112 is energized, the pressure-holding valve 110 is closed to prevent a flow of a pressurized fluid delivered from the anti-lock pressure control pump 104 towards the wheel brake cylinder 92, so that the hydraulic pressure in the wheel brake cylinder 92 is held constant at the present value. The pressure-holding valve 110 is provided with a by-pass passage 114 in which is provided a check valve 116 for preventing a fluid flow in a direction from the pump 104 towards the wheel brake cylinder 92.

A reservoir passage 118 is connected at one end thereof to a portion of each branch passage 98 between the pressure-holding valve 110 and the wheel brake cylinder-92, and at the other end to a reservoir 120. The reservoir passage 118 is provided with a normally closed solenoid-operated shut-off valve in the form of a pressure-reducing valve 130 having a coil 132 (FIG. 4). When the coil 132 is energized, the pressure-reducing valve 130 is opened to permit the pressurized fluid to be discharged from the wheel brake cylinder 92 towards the reservoir 120, so that the fluid pressure in the wheel brake cylinder 92 is reduced.

The reservoir 120 has a housing, a piston 132 which is substantially fluid-tightly and slidably received in the housing and which cooperates with the housing to define a reservoir chamber 136, and biasing means in the form of a spring 138 biasing the piston 134. The reservoir chamber 136 stores the working fluid under pressure in the presence of a biasing action of the spring 138.

The pump passage 102 consists of a suction passage 140 and a delivery passage 142 which are located on the opposite sides of the anti-lock pressure control pump 104. These suction and delivery passages 140, 142 are provided with respective check valves in the form of a suction valve 144 and a discharge valve 146. The delivery passage 142 is provided with a damper chamber 148 and a flow restrictor in the form of an orifice 150, which are connected in series. The damper chamber 148 and the orifice 150 function to reduce a pressure pulsation of the pressurized fluid delivered by the pump 104.

There will next be described an electric control system of the present braking system.

The electric control system includes a pressure control device 160 as shown in the block diagram of FIG. 4. The pressure control device 160 is principally constituted by a computer incorporating a CPU 162, a ROM 164 and a RAM 166. The ROM 164 stores various control programs including those for executing a pump boosting control routine (post-boosting-limit control routine), an anti-lock pressure control routine and an initial diagnosis control routine. The CPU 162 operates to execute these control routines, according to the appropriate control programs stored in the ROM 164, while utilizing a temporary data storage function of the RAM 166.

The pressure control device 160 has an input portion 168 adapted to receive output signals of various switches and sensors such as an ignition switch 201, a stop switch 202, an operating force sensor 203, a master cylinder pressure sensor 204, an electric current sensor 205, a deceleration sensor 206 and wheel speed sensors 208. The ignition switch 201 is operated by an operator of the vehicle, and has an ON state and an OFF state, which are selectively established. The ignition switch 201 is turned ON to start a drive power source such as an engine of the vehicle. When the ignition switch 201 is in the ON state, it means that the vehicle is ready for running. When the ignition switch 201 is in the OFF state, it means that the vehicle is not ready for running. The stop switch .202 is placed in an ON state when the operating stroke of the brake pedal 10 has reached a predetermined value. The output signal of this stop switch 202 indicates whether the brake pedal 10 is in operation or not.

The operating force sensor 203 is provided to detect an operating force acting on the brake pedal 10 during operation of the brake pedal 10 by the vehicle operator. The master cylinder pressure sensor 204 is provided to detect the hydraulic pressure in the first front pressurizing chamber 36. In this respect, it is noted that the hydraulic pressure in the chamber 36 is a sum of a fluid pressure corresponding to the operating force acting on the brake pedal 10 as boosted by the booster 12) and a fluid pressure generated by an operation of the pressurizing device 64. The electric current sensor 205 is provided to detect an amount of electric current flowing through the coil 84 of the pressure control valve 70. The deceleration sensor 206 is provided to detect the deceleration value of the vehicle. The wheel speed sensors 208 are provided for detecting the rotating speeds of the respective wheels FL, FR, RL, RR. In the present embodiment, the vehicle running speed can be calculated or estimated on the basis of the detected rotating speeds of the wheels. However, a vehicle speed sensor exclusively used to detect the vehicle running speed may be provided in addition to the wheel speed sensors 208. The vehicle speed sensor may be arranged to detect the vehicle running speed on the basis of the rotating speed of the output shaft of the drive power source.

The pressure control device 160 also has an output portion 210 connected to the pressure-increasing pump motor 68 for the pump 66, the pump motors 106 for the two anti-lock pressure control pumps 104 in the two brake-application sub-systems, the coil 84 of the pressure control valve 70, and the coils 112 and 132 of the pressure-holding and pressure-reducing valves 110, 130 in the two brake-application sub-systems.

There will be described an operation of the hydraulically operated braking system constructed as described above.

While the brake pedal 10 is not in operation, the coils 70, 112, 132 are held in the de-energized state, while the pressure-increasing pump is held off. Upon operation of the brake pedal 10, the pressurizing pistons 32, 34 are accordingly advanced, and a hydraulic pressure corresponding to the operating force acting on the brake pedal 10 are generated in the front pressurizing chambers 36, 38. The generated hydraulic pressure is applied to the wheel brake cylinders 92 to operate the wheel brakes 90 for braking the automotive vehicle. The hydraulic pressure detected by the master cylinder pressure sensor 204 corresponds to the operating force acting on the brake pedal 10.

When the master cylinder pressure $P_{MC}$ detected by the master cylinder pressure sensor 204 has been raised to a critical value P0 corresponding to the boosting limit of the booster 12, a pump boosting control of the master cylinder pressure by the pressurizing device 64 is initiated according to the pump boosting control routine indicated above. The boosting limit is a point at which the boosting ratio of the booster 12 is reduced or at which a rate of increase of the hydraulic pressure in the wheel brake cylinders 92 with an increase in the operating force of the brake pedal 10 while the pressuring device 64 is not in operation is reduced. The pump boosting control of the master cylinder pressure (hydraulic pressure in the wheel brake cylinders 92) is initiated when the operating force of the brake pedal 10 has exceeded a value corresponding to the boosting limit of the booster 12 or the critical value P0. The pump boosting control is effected to permit the master cylinder pressure to increase after the boosting limit of the booster 12 has been reached at the critical point P0, such that the rate of increase of the master cylinder pressure after the boosting limit has been reached remains unchanged, that is, is equal to the rate of increase before the boosting limit has been reached. The pump boosting control may be referred to as "post-boosting-limit control" of the master cylinder pressure.

Figure 3:
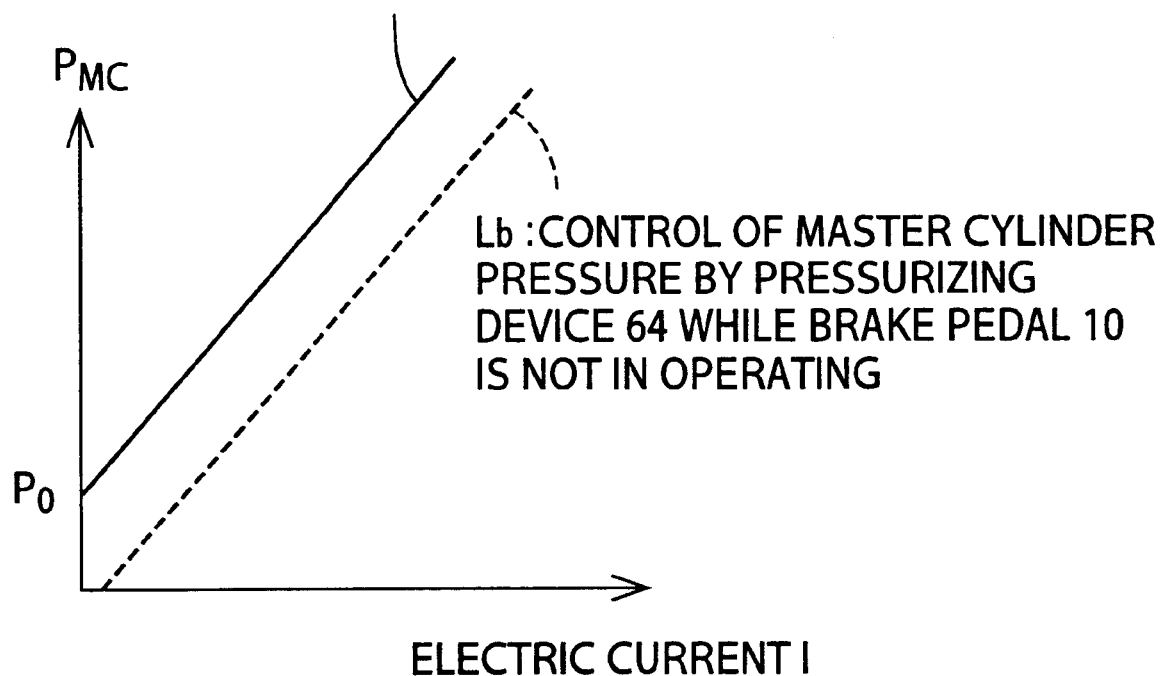
FIG. 3 is a graph indicating control data maps used to control an electric current to be applied to the pressure control valve of FIGS. 2A and 2B.

In the pump boosting control, the pressure-increasing pump 66 is turned on, and the pressure control valve 70 is controlled to regulate the hydraulic pressure in the rear pressurizing chamber 50 of the master cylinder 14, for controlling the hydraulic pressure in the wheel brake cylinders 82 so as to approach a calculated desired value. The desired value is determined by the pressure control device 160 such that the wheel brake cylinder pressure after the boosting limit of the booster 12 has been reached is raised at the same rate as that before the boosting limit has been reached. In this respect, it is noted that the hydraulic pressure as detected by the master cylinder pressure sensor 204 (master cylinder pressure $P_{MC}$) is a sum of the fluid pressure corresponding to the operating force of the brake pedal 10 and the pressure in the rear pressurizing chamber 50 generated by an operation of the pressurizing device 64, and may be considered to the equal to the hydraulic pressure in the wheel brake cylinders 92. In the present embodiment, the ROM 164 stores a control data map representative of a linear relationship between the master cylinder pressure $P_{MC}$ and the electric current I to be applied to the coil 84 of the pressure control valve 70, which linear relationship assures that the rate of increase of the master cylinder pressure $P_{MC}$ after the boosting limit of the booster 12 has been reached is the same as that before the boosting limit has been reached. A solid line La in FIG. 3 indicates this linear relationship represented by the stored control data map. In FIG. 3, a broken line Lb represents a linear relationship between the master cylinder pressure $P_{MC}$ and the electric current I during operation of the pressurizing device 64 while the brake pedal 10 is not in operation. The ROM 164 also stores a control data map represented by the broken line Lb.

If the hydraulic pressure in any one of the wheel brake cylinders 92 has been increased to an upper limit determined by the friction coefficient of the surface of the roadway on which the vehicle is running, an anti-lock pressure control is initiated for the wheel brake cylinder 92 in question, according to the anti-lock pressure control routine indicated above. In the anti-lock pressure control, the pressure-holding valve 110 and pressure-reducing valve 130 corresponding to the appropriate wheel brake cylinder 92 are suitably controlled (opened or closed) for controlling the hydraulic pressure of the wheel brake cylinder 92, so as to prevent an excessive slipping tendency of the corresponding wheel FL, FR, RL, RR.

Then, an initial diagnosis control according to the initial diagnosis control routine indicated above will be described.

In the initial diagnosis control, the sensors, switches, solenoid-operated valves, and computer as shown in FIG. 4 (hereinafter referred to as "sensors, etc.") as well as the pressurizing device 64 are diagnosed for any abnormality. The diagnosis of the sensors, etc. is effected when the ignition switch 201 is turned from it OFF state to its ON state. Since this diagnosis does not relate to the principle of this invention, no further description of this diagnosis is deemed necessary.

The diagnosis of the pressurizing device 64 is effected when the non-operated position of the brake pedal 10 is detected for the first time after the ignition switch 201 is turned from OFF state to the ON state. If the brake pedal 10 is in operation when the ignition switch 201 is turned ON, the diagnosis is effected when the brake pedal 10 is returned to the non-operated position. As described above, the mater cylinder pressure $P_{MC}$ detected by the master cylinder pressure sensor 304 is a sum of the fluid pressure generated by the pressurizing device 64 and applied to the master cylinder 14 from the pressurizing device 64 and the fluid pressure corresponding to the operating force acting on the brake pedal 10. When the brake pedal 10 is not in operation, the master cylinder pressure $P_{MC}$ is the pressure generated by the pressurizing device 64.

To diagnose the pressurizing device 64, the pressure-increasing pump 66 is operated by the pump motor 68 while the pressure-holding valves 110 and the pressure control valve 70 are held in the closed state. If the hydraulic pressure in the first front pressurizing chamber 36 has not been raised to a predetermined value within a predetermined time, the pressure control device 160 determines that the pressurizing device 64 is abnormal or defective.

If the hydraulic pressure in the chamber 36 has been raised to the predetermined value within the predetermined time, the pressure-holding valves 110 are opened, and a determination as to whether the stop switch 202 is turned ON within a predetermined time is effected. This determination is a determination as to whether the brake pedal 10 was in an operated position when the hydraulic pressure in the pressurizing chamber 36 was detected. The diagnosis of the pressurizing device 64 is effected in principle while the brake pedal 10 is not in operation. In this respect, an operation of the brake pedal 10 will not necessarily cause the stop switch 202 to be immediately turned ON if the pressure-holding valves 110 are placed in the closed state. Namely, the stop switch 202 may be in the OFF state while an operating force is acting on the brake pedal 10. If it is determined that the stop switch 202 has not been turned ON within the predetermined time, this means that the brake pedal 10 was not in operation. In this case, it is determined that the pressurizing device 64 is normal.

Figure 5:
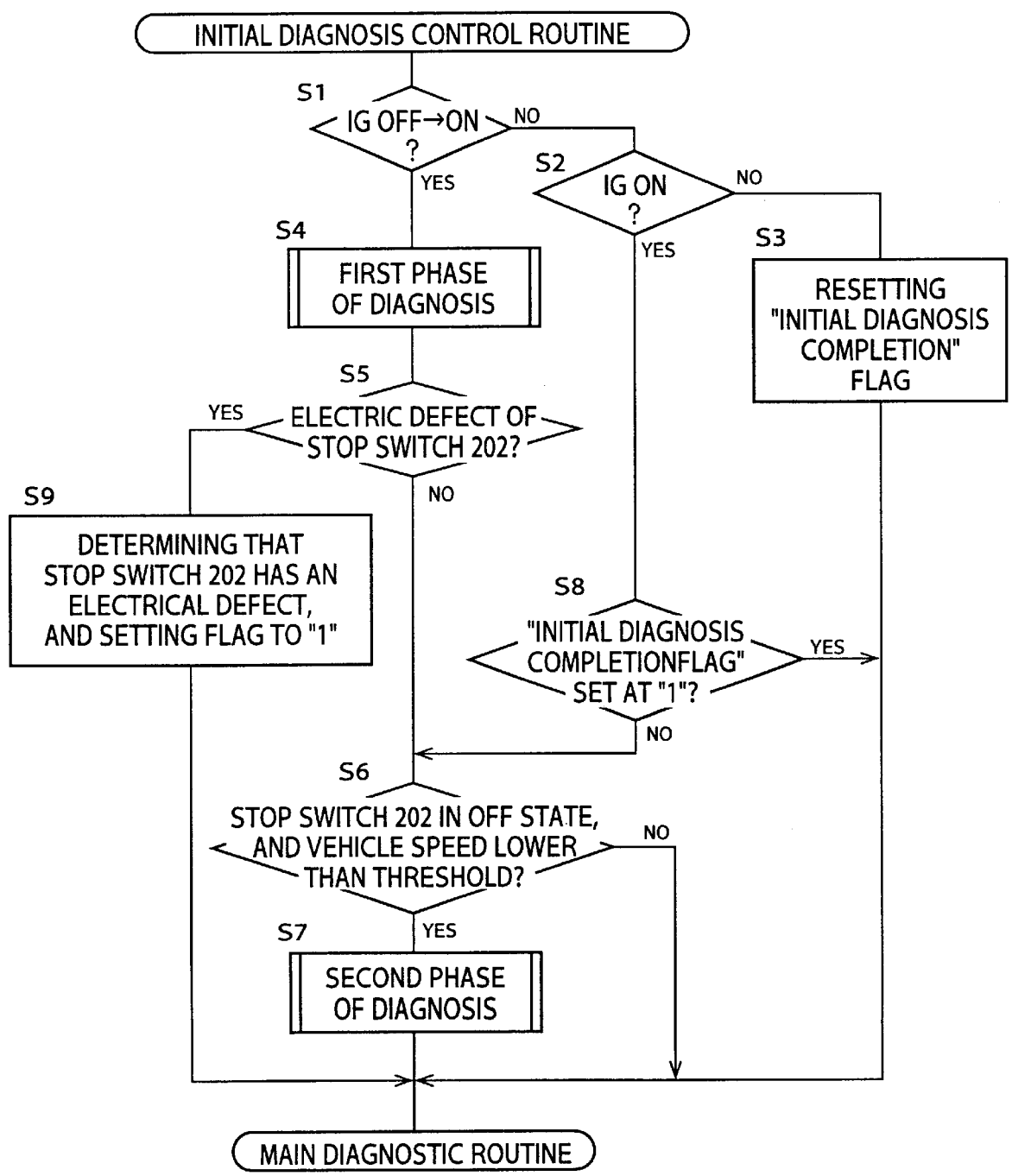
FIG. 5 is a flow chart illustrating an initial diagnosis control routine executed according to a control program stored in a ROM of the pressure control device of FIG. 4.

The initial diagnosis control routine illustrated in the flow chart of FIG. 5 is executed with a predetermined cycle time. This routine is initiated with step S1 to determine whether the ignition switch 201 has been turned ON, that is, whether the state of the ignition switch 201 has been changed from the OFF state to the ON state. If a negative decision (NO) is obtained in step Si, the control flow goes to step S2 to determine whether the ignition switch 201 is in the ON state. If the ignition switch 201 is in the OFF state, the negative decision (NO) is obtained in steps S1 and S2, and the control flow goes to step S3 to reset an INITIAL DIAGNOSIS COMPLETION flag to "0". In this case, the initial diagnosis control is not effected. The INITIAL DIAGNOSIS COMPLETION flag is set to "1" when the initial diagnosis of the pressurizing device 64 has been completed or when an electrical defect of the stop switch 202 such as disconnection of an electric wire of the stop switch 202 has been detected, as described below in detail.

When the ignition switch has been turned ON, an affirmative decision (YES) is obtained in step S1, and the control flow goes to step S4 to effect a first phase of the diagnosis in which the sensors, etc. are diagnosed. Step S4 is followed by step S5 to determine whether the stop switch 202 has an electrical defect such as disconnection of its electric wire. If a negative decision (NO) is obtained in step S5, the control flow goes to step S6 to determine whether the stop switch 202 is in the OFF state while the detected vehicle speed is lower than a predetermined threshold. When the vehicle is running at a speed lower than the threshold while the brake pedal 10 is not in operation, an affirmative decision (YES) is obtained in step S6, and the control flow goes to step S7 to effect a second phase of the diagnosis in which the pressurizing device 64 is diagnosed, as described below in detail. In this respect, it is noted that a need of operation of the brake pedal 10 by the vehicle operator is extremely small during running of the vehicle at a relatively low speed, and that it is generally safe to diagnose the pressurizing device 64 in such a running condition of the vehicle. It is also noted that there is an accordingly low possibility that the brake pedal 10 is operated during the diagnosis of the pressurizing device 64.

It is further noted that the determination in step S6 as to whether the vehicle running speed is lower than the predetermined threshold is not essential. That is, step S6 may be modified to determine whether the stop switch 202 in the OFF state (namely, whether the brake pedal 10 is not in operation).

Figure 6:
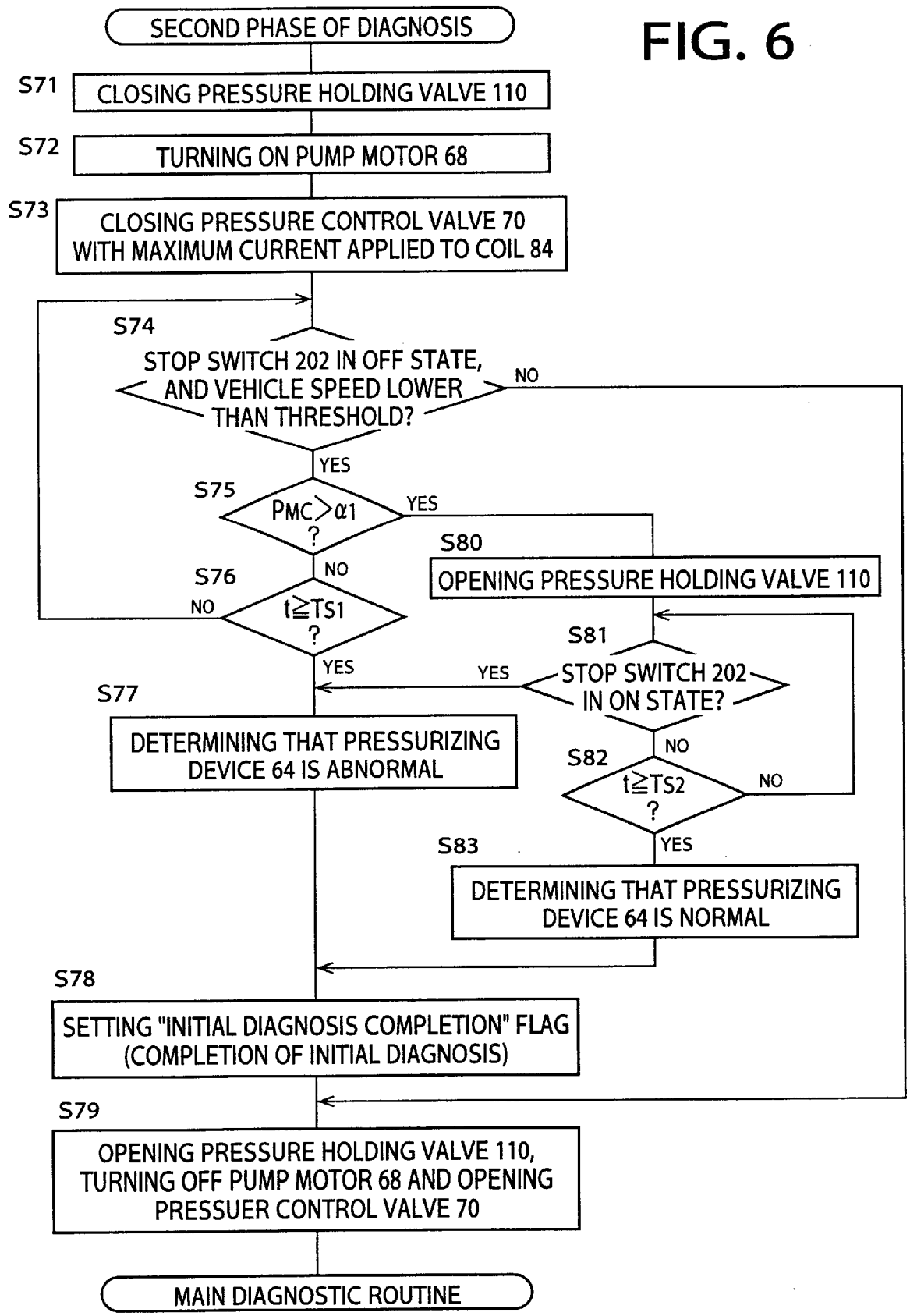
FIG. 6 is a flow chart illustrating a portion of the initial diagnosis control routine of FIG. 5.

The second phase of the initial diagnosis of the pressurizing device 64 is illustrated in the flow chart of FIG. 6, wherein steps S71–S73 are implemented to energize the coil 112 of each pressure-holding valve 110 for closing the valve 110, activate the pump motor 68 and apply a maximum electric current to the coil 84 of the pressure control valve 70 for closing the pressure control valve 70. Thus, the pump 58 is operated while it is disconnected from both an actuator in the form of the wheel brake cylinders 92 and a low-pressure source in the form of the reservoir 58. The pump motor 68 is operated so that the pump 66 is operated under a predetermined condition suitable for diagnosing the pressurizing device 64.

Step S73 is followed by step S74 to determine whether the stop switch 202 is in the OFF state while the vehicle running speed is lower than the predetermined threshold. If an affirmative decision (YES) is obtained in step S74, the control flow goes to step S75 to determine whether the detected master cylinder pressure $P_{MC}$ has exceeded a predetermined value α1. If a negative decision (NO) is obtained in step S75, the control flow goes to step S76 to determine whether a predetermined time Ts1 has passed after the pump motor 68 was activated. If the master cylinder pressure PMC has not been raised to a value higher than the predetermined value α1 within the predetermined time Ts1, a negative decision (NO) is obtained in step S75, and the control flow goes to step S77 to determine that the pressurizing device 64 is abnormal or defective, and then to step S78 to set the INITIAL DIAGNOSIS COMPLETION flag to "1". Step S78 is followed by step S79 in which the pressure-holding valves 110 and the pressure control valve 70 are returned to the normal open state, and the pump motor 68 is turned off.

The predetermined value α1 of the master cylinder pressure $P_{MC}$ is a value which is expected to be reached where the pump 66 is held operated by the pump motor 68 under the predetermined condition for the predetermined time Ts1. In the present example wherein the pressure-holding valves 110 and the pressure control valve 70 are held closed during the second phase of the initial diagnosis, the predetermined time Ts1 can be made relatively short. Further, the closed state of the valves 110, 70 eliminates an influence of these valves 110, 70 on an increase in the delivery pressure of the pump 66, the master cylinder pressure $P_{MC}$ corresponding to the operation of the pump 66 can be detected with a high degree of accuracy.

If the master cylinder pressure $P_{MC}$ has been increased to a level higher than the predetermined value α1 within the predetermined time Ts1, an affirmative decision (YES) is obtained in step S75, and the control flow goes to step S80 to open the pressure-holding valves 110, and then to step S81 to determine whether the stop switch 202 is in the ON state. If the stop switch 202 remains in the OFF state, that is, if the brake pedal 10 remains in the non-operated position, a negative decision (NO) is obtained in step S81, and the control flow goes to step S82 to determine whether a predetermined time Ts1 has passed after the pressure-holding valves 110 were opened. If the stop switch 202 is turned on before the predetermined time Ts2 has passed, it is considered that the master cylinder pressure $P_{MC}$ has exceeded the predetermined value α1 due to an operation of the brake pedal 10 rather than an operation of the pump 66 of the pressurizing device 64. In this case, an affirmative decision (YES) is obtained in step S81, and the control flow goes to step S77 to determine that the pressurizing device 64 is abnormal. The predetermined time Ts2 is a time necessary for the stop switch 202 to be turned on (for the operating stroke of the brake pedal 10 to exceed a predetermined value) after the pressure-holding valves 110 are opened, while an operating force is acting on the brake pedal 10.

If the stop switch 202 remains in the OFF state until the predetermined time Ts2 has passed, on the other hand, an affirmative decision (YES) is obtained in step S81, and the control flow goes to step S82 to determine that the pressurizing device 64 is normally functioning. In this case, too, steps S78 and S79 are then implemented to perform the processing required to complete the diagnosis.

If the stop switch 202 is in the ON state or the vehicle running speed is not lower than the threshold, a negative decision (NO) is obtained in step S74, and the control flow goes to step S79, while skipping steps S75–S78 and S80–S83, so that the INITIAL DIAGNOSIS COMPLE- TION flag is kept in the reset state (held at "0"). That is, the diagnosis of the pressurizing device 64 is not effected or is inhibited, in order to improve the reliability or accuracy of the diagnosis.

As long as the ignition switch 201 which was turned ON is held in the ON state, a negative decision (NO) is obtained in step S1 while an affirmative decision (YES) is obtained in step S2, and therefore step S8 is repeatedly implemented to determine whether the INITIAL DIAGNOSIS COMPLETION flag is set at "1". If an affirmative decision (YES) is obtained in step S8, the initial diagnosis control routine is terminated, without continuing the second phase of the diagnosis in step S7 (routine of FIG. 6). If the INITIAL DIAGNOSIS COMPLETION flag remains in the reset state "0", a negative decision (NO) is obtained in step S8, and steps S6 and S7 are implemented so that the diagnosis of the pressurizing device 64 is continuously executed. That is, steps S1, S2, S8, S6 and S7 are repeatedly implemented after the ignition switch 201 is turned ON, until the initial diagnosis (second phase of the diagnosis) is completed.

If the stop switch 202 has an electrical defect, an affirmative decision (YES) is obtained in step S5, and the control flow goes to step S9 to determine that the stop switch 202 has an electrical defect, and to set the INITIAL DIAGNOSIS COMPLETION flag to "1".

When the initial diagnosis has revealed that the pressurizing device 64 is abnormal or defective, an operation of the pump 66 is inhibited, and the coil 84 of the pressure control valve 70 is de-energized. Further, the rear pressurizing chamber 50 is communicated with the master reservoir 58 through the pressure control valve 70 in its open state, so that the working fluid is supplied from the master reservoir 58 into the rear pressurizing chamber 50 according to an operation of the brake pedal 10, to thereby prevent the fluid pressure in the chamber 50 from being reduced below the atmospheric pressure. The wheel rake cylinders 92 can be activated to operate the wheel brakes 90, with the fluid pressure generated in the front pressurizing chambers 36, 38 depending upon the operating force acting on the brake pedal 10.

As described above, the present embodiment of the invention is adapted to effect a diagnosis of the pressuring device 64 on the basis of the master cylinder pressure $P_{MC}$ as detected by the master cylinder pressure sensor 204 while the brake pedal 10 is not in operation. Since the diagnosis is effected while the brake pedal 10 is not in operation, the reliability of the diagnosis is improved. Further, it is noted that the master cylinder pressure $P_{MC}$ as detected by the master cylinder pressure sensor 204 minus the pressure corresponding to the operating force of the brake pedal 10 corresponds to the operating state of the pressurizing device 64. Therefore, the diagnosis on the basis of the detected master cylinder pressure PMC while the brake pedal 10 is not in operation can be considered to be a direct diagnosis of the pressurizing device 64 with an improved degree of accuracy. Although the conventional diagnosing apparatus uses two pressure sensors to effect a diagnosis, the apparatus according to the present invention is capable of diagnosing the pressurizing device 64 on the basis of the output of a single pressure sensor in the form of the master cylinder pressure sensor 204.

The reliability of the present diagnosing apparatus is further improved owing to an arrangement wherein a determination that the pressurizing device 64 is normal is not made immediately after the detection that the detected master cylinder pressure $P_{MC}$ is higher than the threshold value $\alpha 1$, namely, the determination is made only after it is determined that the brake pedal 10 is not in operation, after the pressure-holding valves 110 are returned to their open state. In addition, the pressure of the fluid pressurized by the pump 66 can be detected with high accuracy, and the accuracy of the diagnosis of the pressurizing device 64 can be accordingly improved, since the pump motor 68 is operated to operate the pump 66 while the pressure-holding valves 110 and the pressure control valve 70 are held in the closed state, in order to reduce an influence of the valves 110, 70 on an increase in the master cylinder pressure as a result of the operation of the pump 66. Further, the diagnosis of the pressurizing device 64 is effected while a possibility of an operation of the brake pedal 10 is extremely low, with the vehicle running speed being relatively low, so that the accuracy of the diagnosis is further improved, and the diagnosis is effected under a safe running condition of the vehicle. The diagnosis during vehicle running at a relatively low speed means that the diagnosis is effected at a comparatively early point of time after the ignition switch has been turned on, so that the reliability of the diagnosing apparatus is accordingly improved.

It will be understood from the foregoing description of the present first embodiment of the invention that a portion of the pressure control device 160 assigned to execute the initial diagnosis control routine of FIGS. 5 and 6 constitutes a diagnosing device which determines whether the pressurizing device 64 is abnormal or not, on the basis of the output of the master cylinder pressure sensor 204 while the brake pedal 10 is not in operation and while the pressurizing device 64 is in operation. This diagnosing device cooperates with the master cylinder pressure sensor 204 to constitute a major portion of a diagnosing apparatus for detecting an abnormality of the pressurizing device 64. It will also be understood that the wheel speed sensors 208 serve as a device for detecting the running speed of the vehicle, and that a portion of the above-indicated diagnosing device assigned to implement steps S6 and S7 constitutes a determining portion operable during running of the vehicle at a speed lower than a predetermined threshold, for determining whether the pressurizing device 64 is abnormal or not.

It will further be understood that the ignition switch 201 and a portion of the pressure control device 160 assigned to implement step S1 constitute a major portion of a ready-state detecting device for determining whether the vehicle is ready for running. It will also be understood that the stop switch 202 and a portion of the pressure control device 160 assigned to implement steps S6, S74 constitute a major portion of a braking operation detecting device for detecting whether the brake pedal 10 is in operation or not. It will also be understood that a portion of the pressure control device assigned to implement steps S1, S6 and S7 constitutes a major portion of a determining portion operable after the vehicle is made ready for running and while the brake pedal 10 is not in operation, for determining whether the pressurizing device 64 is abnormal or not.

It will also be understood that the pressure-holding valves 110 function as a fluid communication regulating device having an open state for non-restricted fluid communication between the pressurizing device 64 and an actuator in the form of the wheel brake cylinders 92, and a restricted state for restricted fluid communication the pressurizing device 64 and the wheel brake cylinders 92. It will further be understood that a portion of the pressure control device 160 assigned to implement step S74 constitutes a part of a first terminating device for terminating the diagnosis of the pressurizing device 64 when the brake pedal 10 is operated during the diagnosis, and a part of a second terminating device for terminating the diagnosis when the vehicle speed has exceeded the threshold value.

The present first embodiment is arranged to determine in step S77 that the pressurizing device 64 is abnormal, if the stop switch 202 is detected in step S81 to be placed in the ON state. Namely, the illustrated embodiment is arranged such that step S81 is followed by step S77 when the affirmative decision (YES) is obtained in step S81. However, step S81 may be followed by step S79 if the affirmative decision (YES) is obtained in step S81, so that the diagnosis of the pressurizing device 64 is inhibited, and the INITIAL DIAGNOSIS COMPLETION flag is held in the reset state "0". In this modified arrangement, the diagnosis on the basis of the master cylinder pressure detected while the brake pedal 10 is in operation is inhibited, since the accuracy of the diagnosis under this condition is not sufficiently high.

As a further modification of the first embodiment, step S81 may be followed by a step of determining whether the master cylinder pressure is higher than a predetermined second value $\alpha 2$ higher than the first value $\alpha 1$, if the affirmative decision (YES) is obtained in step S81 as a result of an operation of the brake pedal 10, so that step S83 is implemented to determine that the pressurizing device 64 is normal, if the master cylinder pressure is higher than the second value $\alpha 2$. This second value $\alpha 2$ is a value of the master cylinder pressure which is expected to be established by the operation of the brake pedal 10 and the operation of the pump 66, when the pressurizing device 64 is normal. To determine the value $\alpha 2$, it is possible to use the fluid pressure expected to be established upon a normal operation of the brake pedal 10, or the fluid pressure which corresponds to the operating force detected by the operating force sensor 203. Further, step S81 may be followed, if the affirmative decision is obtained in this step, by a step of determining whether the operating force detected by the operating force sensor 203 is larger than a predetermined threshold. In this case, it is determined that the pressurizing device 64 is normal if the detected operating force is larger than the threshold.

It is also noted that it is not essential to effect the diagnosis of the pressurizing device 64 during vehicle running at a relatively low speed and while the valves 110 and 70 are held closed. For instance, the diagnosis may be effected while the valves 110 are placed in a state in which the fluid flows therethrough are restricted. In this instance, the valves 110 may be arranged such that the rate of fluid flow through the valves 110 placed in the open state can be controlled. It will also be understood that steps S8–S82 are not essential.

In the illustrated embodiment, the maximum electric current I is applied to the pressure control device 70 while the pressurizing device 64 is diagnosed. However, different amounts Ia and Ib of electric current are applied to the pressure control device 70, so that the diagnosis is effected on the master cylinder pressure values detected by the master cylinder pressure sensor 204 while the different current amounts Ia, Ib are applied to the pressure control valve 70. In this case, the diagnosis is effected based on a relationship between the electric current Ia and the detected master cylinder pressure and a relationship between the electric current Ib and the detected master cylinder pressure, as in a second embodiment of this invention illustrated in the flow chart of FIG. 7 which shows the second phase of the diagnosis, that is, the diagnosis of the pressurizing device 64.

Figure 7:
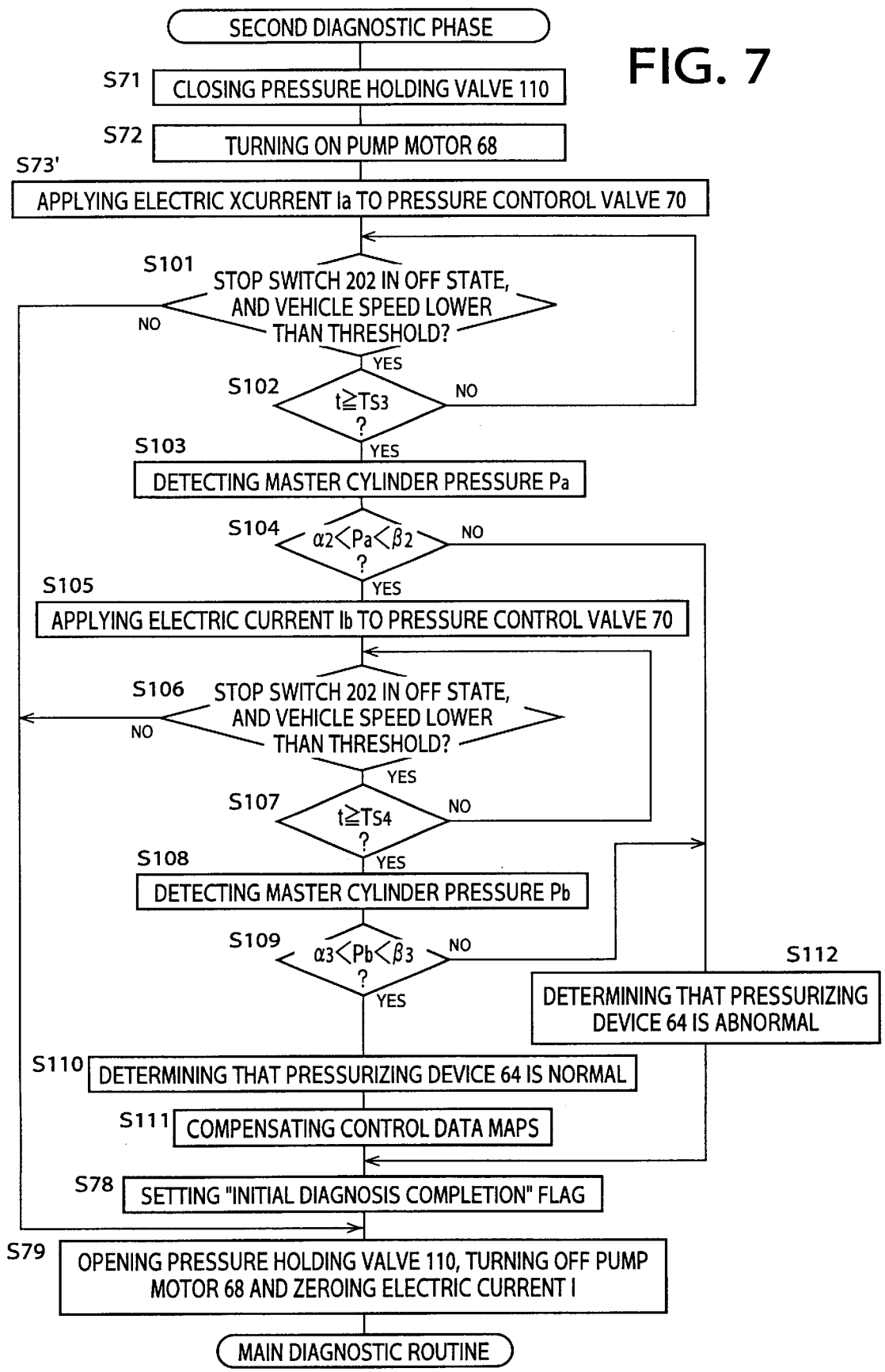
FIG. 7 is a flow chart illustrating a diagnosing routine executed according to a control program stored in a ROM of a pressure control device of a hydraulically operated braking system, which pressure control device includes a diagnosing apparatus constructed according to a second embodiment of this invention.

The control routine of FIG. 7 is initiated with steps S71 and S72 described above with respect to the first embodiment, to close the pressure-holding valves 110 and turn on the pump motor 68. However, step S72 is followed by step S73' in which an electric current Ia is applied to the coil 84 of the pressure control valve 70 so that the pressurizing device 64 is placed in a predetermined first operating condition. Step S73' is followed by step S101 to determine whether the stop switch 202 is in the OFF state while the vehicle running speed is lower than the predetermined threshold. If an affirmative decision (YES) is obtained in step S101, the control flow goes to step S12 to determine whether a predetermined time Ts3 has passed after the application of the electric current Ia to the valve 70 is initiated. If a negative decision (NO) is obtained in step S101, that is, if the stop switch 202 is turned ON or the vehicle running speed has increased to the threshold, before the predetermined time Ts3 has passed, the control flow goes to step S78 in which the pressure-holding valves 110 are opened and the pump motor 68 is turned off, and the coil 84 of the valve 70 is de-energized (the electric current I is zeroed).

If the predetermined time Ts3 has passed with the stop switch 202 held in the OFF state and with the vehicle running speed held lower than the threshold, an affirmative decision (YES) is obtained in step S102, and the control flow goes to step S103 to detect the master cylinder pressure Pa, and to step S104 to determine whether the detected master cylinder pressure Pa is in a predetermined range between lower and upper limits $\alpha 2$ and $\alpha 2$. If an affirmative decision (YES) is obtained in step S104, the control flow goes to step S105 in which an electric current Ib is applied to the coil 84 of the valve 70 so that the pressurizing device 64 is placed in a predetermined second operating condition. Step S105 is followed by steps S106–S109 similar to steps S101–S104. If a predetermined time Ts4 has passed with the stop switch 202 being held in the OFF state and with the vehicle running speed held lower than the threshold, an affirmative decision (YES) is obtained in step S107, and the control flow goes to step S108 to detect the master cylinder pressure Pb, and to step S109 to determine whether the detected master cylinder pressure Pb is in a predetermined second range between lower and upper limits $\alpha 1$ and $\beta 2$.

If an affirmative decision (YES) is obtained in step S109, the control flow goes to step S110 to determine that the pressurizing device 64 is normal. Step S110 is followed by step S111 to effect compensation of a control data map which is subsequently used to effect the diagnosis of the pressurizing device 64, and a control data map which is used to effect the pump boosting control of the master cylinder pressure after the boosting limit of the booster 12 has been reached during an operation of the brake pedal 10.

Figure 8:
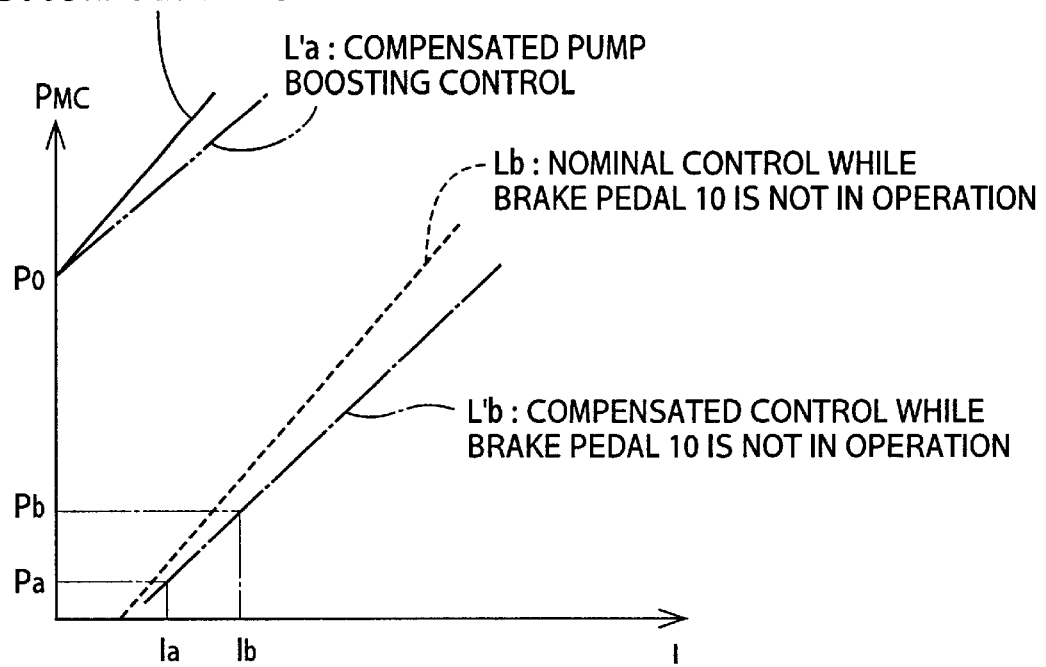
FIG. 8 is a graph indicating control data maps stored in the ROM of the pressure control device of the braking system of FIG. 7.

The present second embodiment is adapted to compensate the control data maps, as indicated in FIG. 8. That is, a nominal linear relationship Lb (indicated by broken line) between the master cylinder pressure $P_{MC}$ and the electric current I while the pressurizing device 64 is in operation and while the brake pedal 10 is not in operation is compensated, that is, is changed to a compensated linear relationship Lb' 8indicated by one-dot chain line), on the basis of the master cylinder pressure values Pa and Pb when the amounts of electric current applied to the valve 70 are equal to Ia and Ib, respectively. Further, a nominal linear relationship La (indicated by solid line) between the master cylinder pressure $P_{MC}$ and the electric current I during the pump boosting control (during operation of the pump 66 after the boosting limit of the booster 12 has been reached during an operation of the brake pedal 10) is changed to a compensated linear relationship La' (indicated by two-dot chain line) such that a straight line representing the compensated linear relationship La' is parallel to a straight line representing the compensated linear relationship Lb'.

Step S111 is followed by steps S78 and S79 which have been described above with respect to the first embodiment.

If the detected master cylinder pressure Pa is not within the predetermined first range, or if the detected master cylinder pressure Pb is not within the predetermined second range, a negative decision (NO) is obtained in step S104 or S109, and the control flow goes to step S112 to determine that the pressurizing device 64 is abnormal.

The relationship between the detected master cylinder pressure $P_{MC}$ and the electric current I applied to the coil 84 of the pressure control valve 70 may be abnormal when the master cylinder pressure sensor 204 is abnormal. Although the first phase of the initial diagnosis in step S4 is adapted to diagnose the master cylinder pressure sensor 204, this diagnosis is to merely check whether the master cylinder pressure sensor 204 generates an output signal. In the second phase of the initial diagnosis which includes steps S104 and S109 permits a diagnosis as to whether the output of the master cylinder pressure sensor 204 is in a normal range. If the determination in step S104 or S109 reveals that the detected master cylinder pressure Pa or Pb is higher than the upper limit $\beta 2$ or $\beta 3$ of the predetermined range, it means that the output of the sensor 204 is abnormally large. If the determination in step S104 or S109 reveals that the detected pressure Pa or Pb is lower than the lower limit $\alpha 2$ or $\alpha 3$ of the predetermined range, it means that the output of the sensor 204 is abnormally small.

As described above, the second embodiment of FIGS. 7 and 8 is adapted to diagnose the pressurizing device 64 on the basis of the two relationships between the master cylinder pressures Pa, Pb and the different amounts Ia, Ib of electric current applied to the coil 84 of the pressure control valve 70. Accordingly, the accuracy of the diagnosis is made higher in this second embodiment than in the first embodiment wherein the diagnosis is effected on the basis of only one relationship between the master cylinder pressure PMC and the electric current I. The present second embodiment permits a diagnosis as to whether a control gain of the pressure control valve 70 (which is a relationship between the master cylinder pressure and the applied electric current) is in a normal range or not.

Further, the control data maps are compensated or updated on the basis of the applied electric current values Ia, Ib and the detected master cylinder pressures Pa, Pb. Accordingly, the accuracy of control of the hydraulic pressure in the wheel brake cylinders 92 can be improved. Namely, the control gain of the pressure control valve 70 is optimized or compensated in step S111 which is implemented when the pressurizing device 64 is determined in step S110 to be normal. The relationship between the electric current I applied to the valve 70 and the fluid pressure established by the valve 70 is not necessarily held constant. That is, the above-indicated control gain or relationship may vary due to a chronological change of the valve 70 or depending upon the operating environment. Accordingly, it is desirable and effective to update or compensate the control data maps representative of the above-indicated relationship, which are used during the pump boosting control the master cylinder pressure after the boosting limit of the booster 12 has been reached, and during the diagnosis of the pressurizing device 64.

This compensation is effected by utilizing the data Pa, Pb, Ia, Ib which are used for and obtained in the initial diagnosis and which are not obtained for the sole purpose of compensating the control data maps.

In the second embodiment, the different amounts Ia, Ib of electric current are applied to the coil 84 of the pressure control valve 70 in each cycle of execution of the initial diagnosis control routine, and the diagnosis of the pressurizing device 64 is effected on the basis of the master cylinder pressure values Pa, Pb detected for the respective electric current amounts Ia, Ib. However, the diagnosis may be effected on the basis of the master cylinder pressure values detected upon application of different amounts of electric current applied to the coil 84 in different cycles of execution of the routine, for instance, in the present and last cycles of execution of the routine. In this case, the different amounts Ia, Ib of electric current may be applied to the coil 84 alternately in the successive cycles of execution of the routine. This modified arrangement permits a reduction in the time required for diagnosing the pressurizing device 64.

Further, three or more master cylinder pressure values may be detected corresponding to respective three or more different amounts of electric current applied to the pressure control valve 70. In this case, each of the control data maps is compensated on the basis of three or more relationships between the mater cylinder pressure and the electric current, which relationships are represented by respective three or more coordinate points in the coordinate system of FIG. 8. In this case, a line connecting or passing these three or more points is not necessarily a straight line, and the compensated control data map may be represented by a curved line (of the n-th order) passing the three or more points, or may be approximated by two or more straight lines passing the three or more points. The control data maps may be otherwise compensated. For instance, the control data maps may be compensated on the basis of the maser cylinder pressure detected upon application of a predetermined amount of electric current, as compared with the nominal value of the master cylinder pressure corresponding to the predetermined amount of electric current, or on the basis of two or more master cylinder pressure values detected upon application of a predetermined amount of electric current in different cycles of execution of the initial diagnosis control routine, for instance, in the last and present control cycles. Namely, the compensation may be made on the basis of at least one value of the master cylinder pressure detected upon application of a predetermined amount of electric current and the nominal value corresponding to that predetermined amount of electric current, or on the basis of a plurality of values of the master cylinder pressure detected upon application of a predetermined amount of electric current. Where two or more values of the master cylinder pressure are detected, an intermediate value or an average value of these values or one of these values which is closest to the nominal value may be used for the compensation.

In the first and second embodiments, the control data map representing the relationship (indicated by the solid line La in FIG. 3) between the electric current I to be applied to the pressure control valve 70 and the master cylinder pressure $P_{MC}$ is stored in the ROM of the pressure control device 160, for effecting the pump boosting control of the master cylinder pressure after the boosting limit of the booster 12 has been reached, such that the rate of increase of the master cylinder pressure after the boosting limit has been reached remains the same, namely, such that the rate of increase of the master cylinder pressure is held constant before and after the master cylinder pressure has been raised to the critical point Po corresponding to the boosting limit. However, the pump boosting control may be otherwise effected. For instance, the pump boosting control of the master cylinder pressure may be accomplished on the basis of a control data map representing a relationship between the pressure in the rear pressurizing chamber 50 and the electric current applied to the pressure control valve 70. In this case, a desired value of the pressure in the rear pressurizing chamber 50 is determined on the basis of the master cylinder pressure $P_{MC}$ and the operating force acting on the brake pedal 10, and the electric current applied to the coil 84 is controlled so as to establish the determined desired value of the pressure in the chamber 50. The pump boosting control on the basis of the pressure in the chamber 50 and the electric current as described above makes it possible to control the master cylinder pressure such that the rate of increase of the master cylinder pressure after the boosting limit of the booster 12 has been reached is different from the rate of increase before the boosting limit has been reached. In the above case wherein the relationship indicated by the solid line La in FIG. 3 is not stored in the ROM, only the relationship indicated by the broken line Lb is stored in the ROM for effecting the initial diagnosis of the pressurizing device 64 by operation of the pump 66 while the brake pedal 10 is not in operation.

The ROM may store control data maps representing two or more relationships between the electric current I and the fluid pressure, which include at least one relationship applicable while the brake pedal 10 is in operation.

The routine of FIG. 7 is formulated to determine in steps S102 and S107 whether the predetermined times Ts3, Ts4 have passed. However, these steps may be modified to determine whether a rate of change of the master cylinder pressure has changed from a value larger than zero to a value smaller than zero, or whether a rate of increase of the master cylinder pressure has exceeded a peak value. In any case, the routine must be formulated to detect the master cylinder pressure when a change of the master cylinder pressure due to a change in the operating state of the pressurizing device 64 has been detected.

Figure 9:
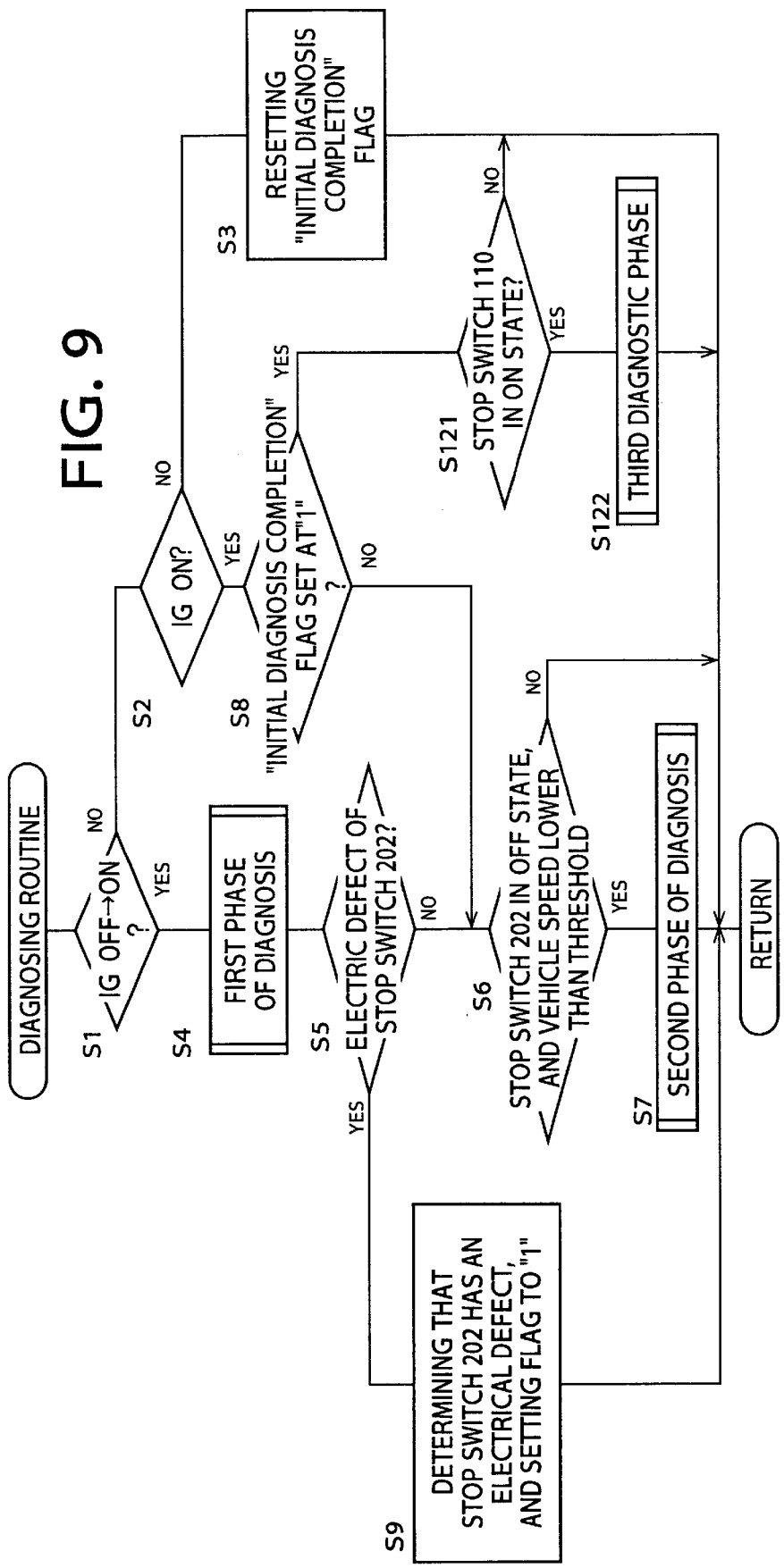
FIG. 9 is a flow chart illustrating a diagnosing routine executed according to a control program stored in a ROM of a pressure control device of a hydraulically operated braking system, which pressure control device serves as a major portion of a diagnosing apparatus constructed according to a third embodiment of this invention.

According to the present invention, the diagnosis of the pressurizing device 64 may include a third phase of the diagnosis wherein the pressurizing device 64 is diagnosed on the basis of the master cylinder pressure detected while the brake pedal 10 is in operation. For instance, a diagnosing detecting routine for diagnosing the pressurizing device 64 may include not only the first and second phases of the initial diagnosis described above with respect to the first and second embodiments by reference to the flow charts of FIGS. 5–7, but also a third phase of the initial diagnosis as illustrated in the flow chart of FIG. 9. Described in detail, the diagnosing routine of FIG. 9 according to a third embodiment of the present invention includes steps S121 and S122 implemented after the first and second phases are completed, that is, after the affirmative decision (YES) is obtained in step S8. Step S121 is provided to determine whether the stop switch 202 is in the ON state, that is, whether the brake pedal 10 is in operation. If an affirmative decision (YES) is obtained in step S121, the control flow goes to step S122 to effect the third phase of the initial diagnosis of the pressurizing device 64.

Figure 10:
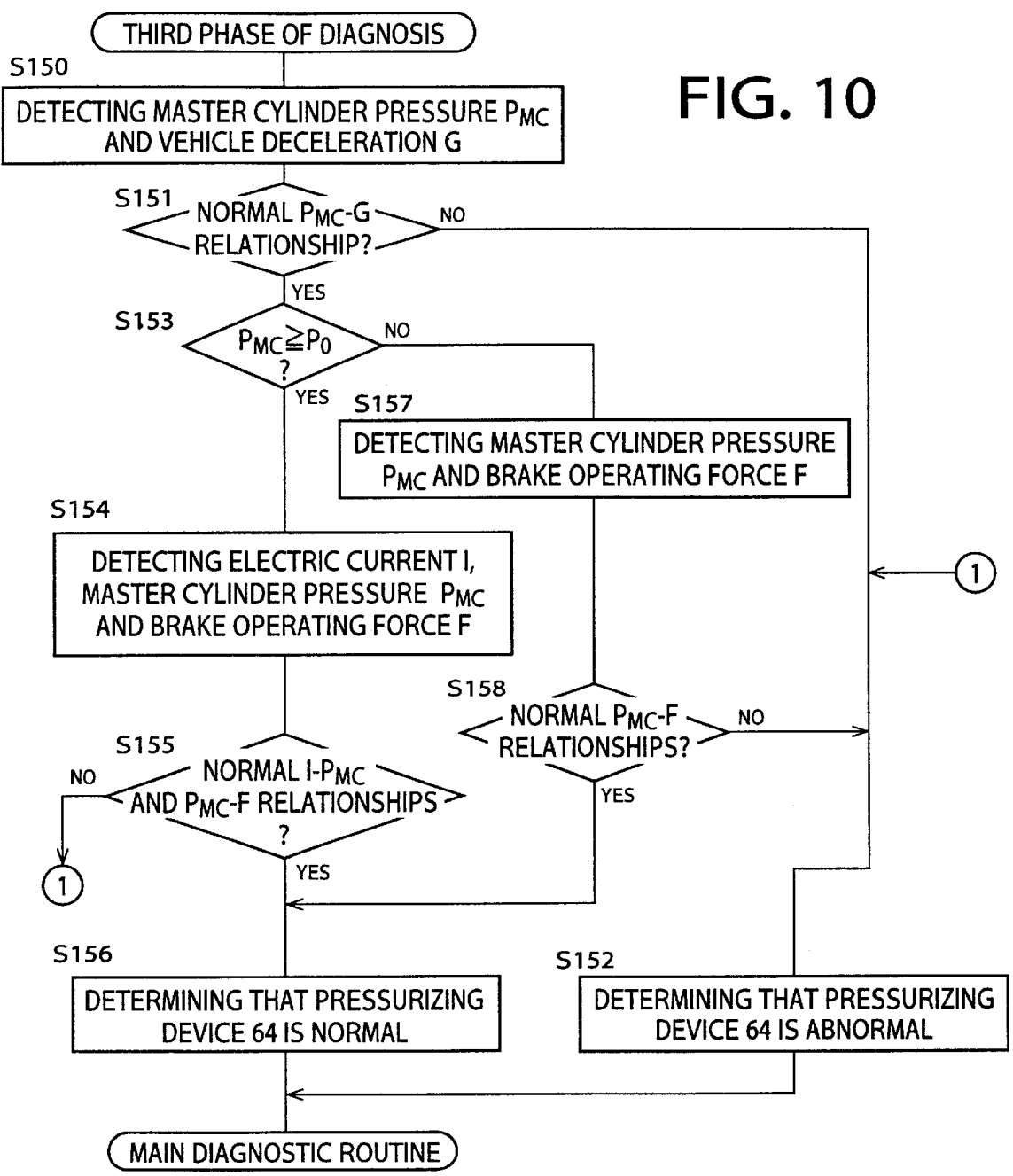
FIG. 10 is a flow chart illustrating a portion of the diagnosing routine of FIG. 9.
Figure 11:
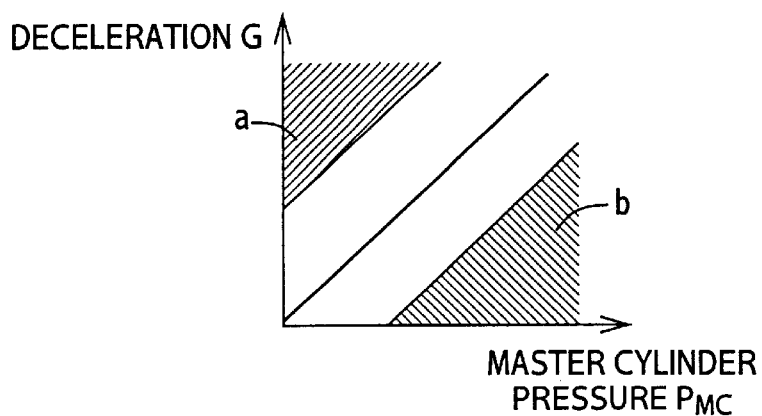
FIG. 11 is a view illustrating a diagnosing data map stored in a ROM of the pressure control device of FIG. 9.

The third phase in step S122, which is illustrated in the flow chart of FIG. 10, is initiated with step S150 to detect the master cylinder pressure $P_{MC}$ and the deceleration value G of the vehicle. Step S150 is followed by step S151 to determine whether the relationship between the detected master cylinder pressure $P_{MC}$ and vehicle deceleration value G is normal. This determination in step S151 is made by determining whether a point represented by the detected master cylinder pressure $P_{MC}$ and vehicle deceleration value G is located within a region "a" or "b" indicated in the graph of FIG. 11. If the point is located in the region "a" or "b", the $P_{MC}$-G relationship between the master cylinder pressure and vehicle deceleration value is not normal, a negative decision (NO) is obtained in step S151, and the control flow goes to step S152 to determine that the pressurizing device 64 is abnormal. If the point is not located in the region "a" or "b", the $P_{MC}$-G relationship is normal. In a normal operation of the braking system without an anti-lock pressure control operation, the pressure-holding valves 110 are held in the open state, so that the pressure in the wheel brake cylinders 92 is increased with an increase in the master cylinder pressure. Accordingly, the vehicle deceleration value G should normally increase substantially in proportion with the master cylinder pressure (wheel brake cylinder pressure), irrespective of whether the pressurizing device 64 is in operation or not. If the vehicle deceleration value G is excessively large or small with respect to the master cylinder pressure, the relationship of the deceleration value G with the master cylinder pressure $P_{MC}$ is abnormal. In the region "a" wherein the deceleration value G is excessively large with respect to the master cylinder pressure (wherein the master cylinder pressure $P_{MC}$ is excessively small with respect to the deceleration value G), the output of the master cylinder pressure sensor 204 is considered to be abnormally small. In the region "b" wherein the deceleration value is excessively small with respect to the master cylinder pressure (wherein the master cylinder pressure is excessively large with respect to the deceleration value), the output of the master cylinder pressure sensor 204 is considered to be abnormally large. In the latter case wherein the point represented by the detected values G and $P_{MC}$ is located in the region "b", the braking effect corresponding to the master cylinder pressure is abnormally small.

If the relationship between the master cylinder pressure and the vehicle deceleration value is normal, that is, if an affirmative decision (YES) is obtained in step S151, the control flow goes to step S153 to determine whether the detected master cylinder pressure $P_{MC}$ has been increased to or has exceeded the critical point Po corresponding to the boosting limit of the booster 12. That is, step S153 is provided to determine whether the pump boosting control of the master cylinder pressure has been initiated or is being effected with the pressurizing device 64 being operated.

Figure 12:
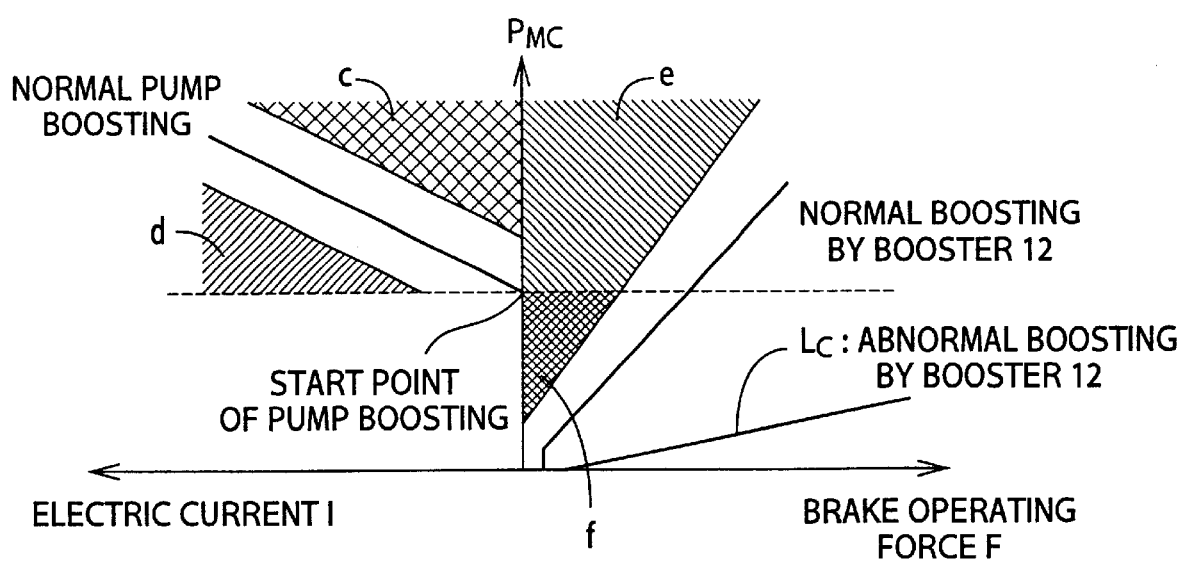
FIG. 12 is also a view illustrating a diagnosing data map stored in the ROM of the pressure control device of FIG. 9.

If the pump boosting control has already been initiated by activation of the pressurizing device 64, an affirmative decision (YES) is obtained in step S153, and the control flow goes to step S154 to detect the master cylinder pressure $P_{MC}$, the electric current I and the operating force F of the brake pedal 10, and then to step S155 to determine whether the relationship between the master cylinder pressure $P_{MC}$ and the electric current I is normal, and whether the relationship between the master cylinder pressure $P_{MC}$ and the operating force F is normal. These determinations in step S155 is effected by determining whether a point represented by the detected master cylinder pressure PMC and the electric current I is located within a region "c" or "d" indicated in the graph of FIG. 12, and whether a point represented by the detected values $P_{MC}$ and F is located within a region "e" also indicated in FIG. 12. If those points are not located within the regions "c", "d" and "e", the relationships are normal, and an affirmative decision (YES) is obtained in step S155. In this case, the relationship between the master cylinder pressure $P_{MC}$ and vehicle deceleration value G, the relationship between the master cylinder pressure $P_{MC}$ and electric current I during the pump boosting control, and the relationship between the brake pedal operating force F and master cylinder pressure $P_{MC}$ are all normal. In this case, the control flow goes to step S156 to determine that the pressurizing device 64 is normal.

If the point represented by the detected master cylinder pressure $P_{MC}$ and the electric current I is located in the region "c" or "d" or if the point represented by the detected values $P_{MC}$ and F is located within the region "e", a negative decision (NO) is obtained in step S155, and the control flow goes to step S152 to determine that the pressurizing device 64 is abnormal. If the point represented by the values $P_{MC}$ and I is located within the region "c", the output of the master cylinder pressure sensor 204 is abnormally large, or the output of the electric current sensor 205 is abnormally small, or the pressure control valve 70 is abnormal, causing generation of a fluid pressure excessively higher than the value corresponding to the applied electric current I. If the point represented by the values $P_{MC}$ and I is located within the region "d", the output of the master cylinder pressure sensor 204 is abnormally small, or the output of the electric current sensor 205 is abnormally large, or the pressure control valve 70 is abnormal, causing generation of a fluid pressure excessively lower than the value corresponding to the applied electric current. If the point represented by the detected value $P_{MC}$ and F is located within the region "e", the output of the master cylinder pressure sensor 204 is abnormally large, or the pressure control valve 70 is abnormal.

Before the pump boosting control of the master cylinder pressure is initiated, that is, before the pressurizing device 64 is not in operation, a negative decision (NO) is obtained in step S153, and the control flow goes to step S157 to detect the master cylinder pressure PMC and the brake operating force F, and to step S158 to determine whether the relationship between the detected values $P_{MC}$ and F is normal. This determination is made by determining whether the point represented by the values $P_{MC}$ and is located within a region "f" also indicated in the graph of FIG. 12. Since the pressurizing device 64 is not in operation, the master cylinder pressure $P_{MC}$ must increase with an increase in the brake operating force F. If the vacuum booster 12 is abnormal in its boosting function, the master cylinder pressure is excessively lower with respect to the brake operating force F, as indicated by solid line Lc in FIG. 12. This abnormality, which is not an abnormality of the pressurizing device 64, is not detected in this embodiment. However, the routine of FIG. 10 may be adapted to detect this abnormality of the booster 12.

If the point represented by the values $P_{MC}$ and F is not located in the region "f", it means that the relationship between these values is normal, and an affirmative decision (YES) is obtained in step S158, and the control flow goes to step S156. If the point is located in the region "f", it means that the relationship is abnormal, and a negative decision (NO) is obtained in step S158, and the control flow goes to step-S152 to determine that the pressurizing device 64 is abnormal. In this case, the output of the master cylinder pressure sensor 204 is abnormally large.

Thus, the diagnosis including the third phase of initial diagnosis of the pressurizing device 64 illustrated in the flow chart of FIG. 10 according to the third embodiment includes (1) a diagnosis effected while the pressurizing device 64 is in operation and while the brake pedal 10 is not in operation, (2) a diagnosis effected while the pressurizing device 64 and the brake pedal 10 are both in operation, and (3) a diagnosis effected while the pressurizing device 64 is not in operation and while the brake pedal 10 is in operation. This arrangement permits early detection of an abnormality of the pressurizing device 64, and detection of an abnormality during a normal operation of the braking system with the brake pedal 10 being depressed by the vehicle operator. It is also noted that the third phase of FIG. 10 does not require the pressure-holding valves 110 to be closed, reducing the amount of energy required for the diagnosis of the braking system. If the second phase of the initial diagnosis of the pressurizing device 64 is effected while the pressure-holding vales 110 are held in the open state in the illustrated embodiments described above, the pressurizing device 64 may be diagnosed on the basis of a relationship between the master cylinder pressure and the vehicle deceleration value, and/or a relationship between the electric current and the vehicle deceleration value.

In the third embodiment, the pressurizing device 64 is determined to be abnormal if an abnormality is detected in any one of the three different conditions (1), (2) and (3) indicated above. However, the pressurizing device 64 may be determined to be abnormal only if abnormalities are detected in at least two of those three different conditions.

Figure 13:
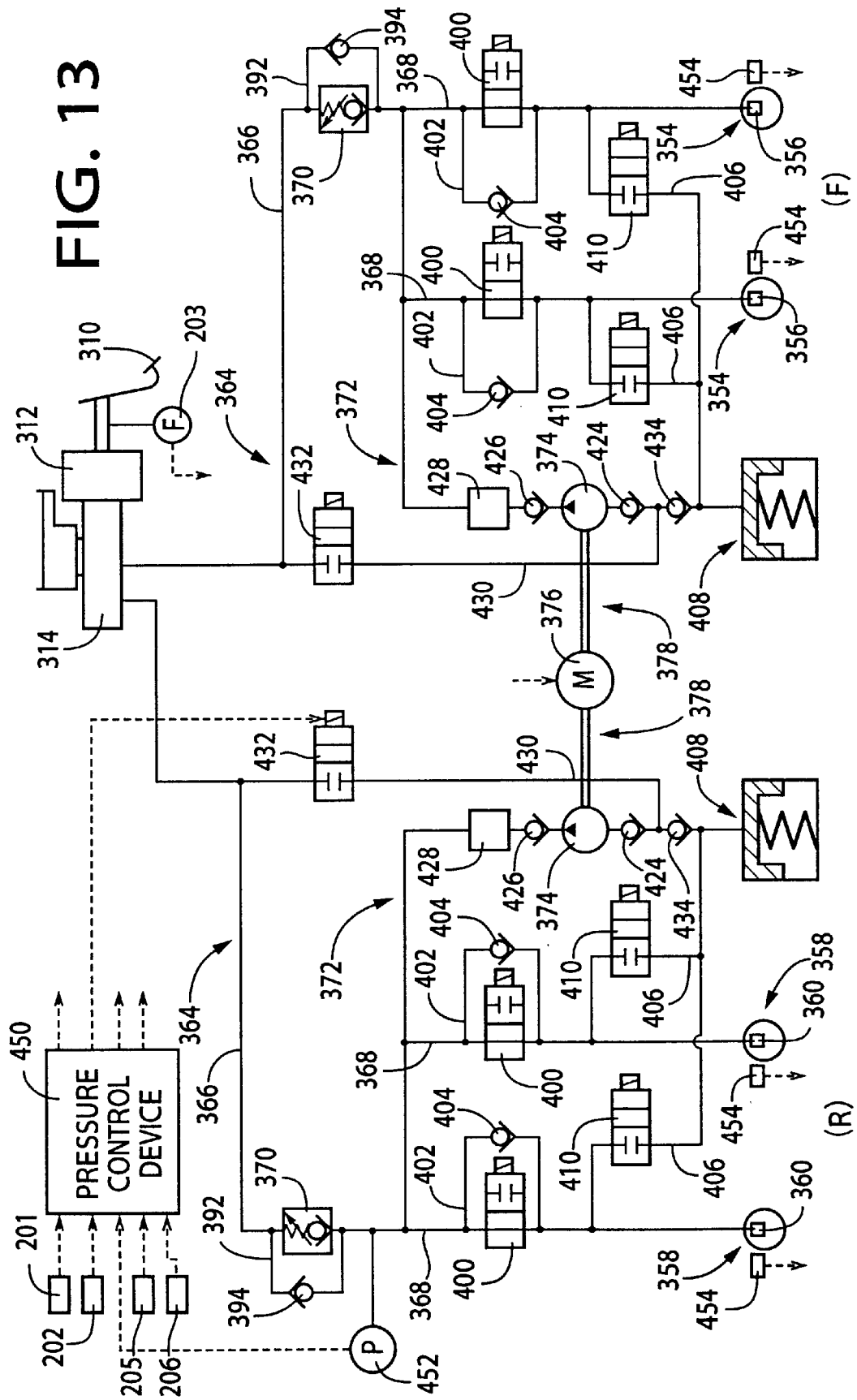
FIG. 13 is a schematic view showing a hydraulically operated braking system an abnormality of which can be detected by a diagnosing apparatus constructed according to a fourth embodiment of the present invention.

Referring next to FIG. 13, there is shown a hydraulically operated braking system for an automotive vehicle, which a pressurizing device, and a diagnosing detecting apparatus constructed according to a fourth embodiment of this invention for diagnosing the pressurizing device.

In FIG. 13, reference numeral 310 denotes a brake operating member in the form of a brake pedal, which is operatively connected to a master cylinder 314 through a vacuum booster 310 (hereinafter referred to simply as "booster 310"). The master cylinder 314 is of a tandem type having a housing and two pressurizing pistons which are slidably disposed in series in the housing and which cooperate with the housing to define two mutually independent pressurizing chambers in front of the respective pistons. When the brake pedal 310 is operated, the mater cylinder 314 is mechanically operated to generate in the two pressurizing chambers the same fluid pressure which corresponds to an operating force acting on the brake pedal 310.

Like the booster 12 provided in the above embodiments, the booster 312 has a negative-pressure chamber and a variable-pressure chamber. When the booster 312 has reached the boosting limit, a pump boosting control of the wheel brake cylinder pressure is initiated by operation of a pressurizing device. 378 which will be described.

The present braking system of FIG. 13 has two brake application sub-systems corresponding to a pair of front wheels and a pair of rear wheels, respectively. In one of the two brake application sub-systems, one of the two pressurizing chambers of the master cylinder 314 is connected to two front wheel brake cylinders 356 for operating two front wheel brakes 354 for respective front left and right wheels FL, FR of the vehicle. In the other sub-system, the other pressurizing chamber of the master cylinder 314 is connected to two rear wheel brake cylinders 360 for operating two rear wheel brakes 358 for respective rear left and right wheels RL, RR of the vehicle. In the front-wheel brake application sub-system, the master cylinder 314 is connected through a main fluid passage 364 to the front wheel brake cylinders 356 for the front wheels FL, FR. The main fluid passage 364 extending from the master cylinder 314 consists of a common passage 366 and two branch passages 368. A pressure control valve 370 is provided in the common passage 366, and he wheel brake cylinders 356 are connected to the respective branch passages 368. A pump passage 372 is connected to a portion of the main fluid passage 364 between the pressure control valve 370 and the wheel brake cylinders 356. A pump 374 is connected to the pump passage 372. The pump 374 is operated by a pump motor 376. The pump 374 and the pump motor 376 constitute a major portion of the pressurizing device 378 indicated above. The pump motor 376 operates the two pumps 374 in the two brake application sub-systems.

The pressure control valve 370 is identical in construction with the pressure control valve 370 provided in the first through third embodiments. However, the pressure control valve 370 is provided in the common passage 366 such that the valve member 80 receives a force F2 based on a difference between fluid pressures in the master cylinder 314 and the wheel brake cylinders 356.

The pressure control valve 370 is provided with a by-pass passage 392 in which is disposed a by-pass valve 394 in the form of a check valve. The by-pass valve 394 permits a flow of the fluid from the master cylinder 314 to the wheel brake cylinders 356 during operation of the brake pedal 310, even if the pressure control valve 370 is closed due to a mechanical sticking of the valve member 80 or due to a fluid pressure acting on a movable member of the valve 370.

A pressure-holding valve 400 in the form of a normally open solenoid-operated shut-off valve is provided in a portion of each branch passage 368 between the corresponding wheel brake cylinder 356 and a point of connection of the branch passage 368 to the pump passage 372. Each pressure-holding valve 400 is provided with a by-passage 402 in which is disposed a by-pass valve 404 in the form of a check valve, which permits a fluid flow from the wheel brake cylinder 356 to the pump passage 372.

A reservoir passage 406 is connected at one end thereof to a portion of each branch passage 368 between the wheel brake cylinder 356 and the pressure-holding valve 400, and at the other end to a reservoir 408. A pressure-reducing valve 410 in the form of a normally closed solenoid-operated shut-off valve is provided in the reservoir passage 406. The reservoir 408 is connected to the main fluid passage 364 through the pump passage 372.

The pump passage 372 is provided with a suction valve 424, a discharge valve 426 and a damper chamber 430.

A supply passage 430 is connected at one end thereof to a portion of the pump passage 372 between the suction valve 424 and the reservoir 408, and at the other end to a portion of the main fluid passage 364 between the master cylinder 314 and the pressure control valve 370. The supply passage 430 is provided with an inflow control valve 432 in the form of a normally closed solenoid-operated shut-off valve. A check valve 434 is provided in a portion of the pump passage 372 between the reservoir 408 and a point of connection of the pump passage 372 to the supply passage 430. The check valve 434 is provided to inhibit a flow of the fluid from the master cylinder 314 to the reservoir 408 while the inflow control valve 432 is open.

The control system for the present braking system of FIG. 13 includes a pressure control device 450 having an input portion to which are connected the ignition switch 201, the stop switch 202, the operating force sensor 203, the electric current sensor 204 and the deceleration sensor 206, which have been described with respect to the preceding embodiment. To the input portion of the pressure control device 450, there are also connected a master cylinder pressure sensor 452, and wheel speed sensors 454 for the respective four wheels The master cylinder pressure sensor 452, which is provided in only the rear brake application sub-system, is connected to a portion of the common passage 366 of the main fluid passage 364 between the pressure control valve 370 and the pressure-holding valve 400. When the pressure control valve 370 is open, the pressure in the master cylinder 314 is detected by the master cylinder pressure sensor 452. When the pressure control valve 370 is closed, that is, when the pressurizing device 378 is in operation, the pressure of the pressurized fluid delivered from the pressurizing device 378 is detected by the master cylinder pressure sensor 452. Since the pump 374 is adapted to pressurize the fluid which has been pressurized by the master cylinder 314, the delivery pressure of the pump 374 (pressurizing device 378) is a sum of the fluid pressure in the master cylinder 314 and a fluid pressure generated by operation of the pump 374.

In the present braking system, an electric current is not applied to the coil of any solenoid-operated valves and the pump motor 376 is not in operation while the brake pedal 310 is not in operation.

Upon operation of the brake pedal 310, the master cylinder generates the fluid pressure corresponding to the operating force F acting on the brake pedal 310, and the thus generated fluid pressure is applied to the wheel brake cylinders 356, 360 to operate the wheel brakes 354, 358.

When the fluid pressure detected by the master cylinder pressure sensor 452 has increased to a value corresponding to the boosting limit of the booster 312, the pump boosting control of the wheel brake cylinder pressure is initiated by opening the inflow control valves 432 of the two brake application sub-systems, and operating the pumps 374, so that the fluid pressurized by the master cylinder 314 is pressurized by the pumps 374, and the thus pressurized fluid is delivered from the pump 374 to the wheel brake cylinders 356, 360. The fluid pressure in the wheel brake cylinders 356, 360 is controlled by controlling the pressure control valves 370.

When the braking system is operated in an anti-lock pressure control mode, the fluid pressure in the appropriate wheel brake cylinder 356, 360 is controlled by suitably opening and closing the corresponding pressure-holding valve 400 and pressure-reducing valve 410, so as to hold the amount of slipping of the corresponding wheel in an optimum range.

The pressurizing devices 378 in the two brake application sub-systems are diagnosed in a manner similar to that used for the pressurizing device 64 in the preceding embodiments. Namely, the initial diagnosis is effected while the pump motor 376 is in operation with the pressure-holding valves 400 and the pressure control valves 370 being both held closed. In the present fourth embodiment, however, the inflow control valves 432 are held open during the initial diagnosis, so that the fluid in the master cylinder 314 can be pumped up and pressurized by the pumps 374. Since the brake pedal 310 is not in operation, the fluid pressure in the master cylinder 314 is equal to the atmospheric pressure.

In this condition, the fluid pressure is detected by the master cylinder pressure sensor 452, and the pressurizing devices 378 are diagnosed depending upon whether the detected fluid pressure is higher than a predetermined threshold, as in the preceding embodiments.

The initial diagnosis in the fourth embodiment while the brake pedal 310 is not in operation may be modified such that the diagnosis is based on a plurality of fluid pressures detected by the master cylinder pressure sensor 452 upon application of different amounts of electric current to the pressure control valves 370, more precisely, based on relationships between the different amounts of electric current and the detected fluid pressure values corresponding to those different amounts. Alternatively, the diagnosis may be effected while the brake pedal 310 is not in operation, such that the diagnosis is based on the electric current, and the fluid pressure and brake operating force which are detected while the brake pedal 310 is in operation. The master cylinder pressure sensor 452 may be provided in only the front brake application sub-systems, rather than in only the rear brake application sub-systems.

Referring further to FIG. 14, there is shown a hydraulically operated braking system for an automotive vehicle, which includes a pressurizing device, and a diagnosing apparatus constructed according to a fifth embodiment of this invention for diagnosing the pressurizing device.

The present braking system is of a diagonal or X-crossing type having two brake application sub-systems. In one of these two sub-systems, namely, first sub-system, one of the two pressurizing chambers of the master cylinder 314 is connected through a first main fluid passage 500 to a front left wheel brake cylinder 504 for a front left wheel brake 502, and to a rear right wheel brake cylinder 508 for a rear right wheel brake 506. In the other or second sub-system, the other pressurizing chamber of the master cylinder 314 is connected through a second main fluid passage 509 to a front right wheel brake cylinder 512 for a front right wheel brake 510, and to a rear left wheel brake cylinder 516 for a rear left wheel brake 514. The first brake application sub-system includes a first pressurizing device 520, while the second sub-system includes a second pressurizing device 522.

The present braking system includes a pressure control device 530 having an input portion to which are connected the ignition switch 201, the stop switch 202, the operating force sensor 203, the electric current sensor 205 and the deceleration sensor 306, which have been described above, and wheel speed sensors 532 and two master cylinder pressure sensors 534, 536. Each of the two master cylinder pressure sensors 534, 536 is connected to a portion of the first or second main fluid passage 500, 509 between the pressure control valve 370 and the pressure-holding valves 400. Unlike the braking system of FIG. 13, the present braking system of the diagonal type of FIG. 14 uses the master cylinder pressure sensor 534, 536 for each of the first and second sub-systems.

The initial diagnosis of the pressurizing devices 520, 422 in the present fifth embodiment is substantially similar to those in the preceding embodiments, but is arranged to take into account a fluid pressure difference between the first and second main fluid passages 500, 509 of the first and second sub-systems. In the braking system of the diagonal type, the fluid pressure in one of the first and second main fluid passages 500, 509 must be equal to that in the other of the first and second main fluid passages 500, 509. If a difference $\Delta P$ between the fluid pressures detected by the two master cylinder pressure sensors 534, 536 is larger than a predetermined value $\Delta Ps$, it means that at least one of the first and second pressurizing devices 520, 522 is abnormal.

The second phase of the initial diagnosis of the pressurizing devices 520, 522 is illustrated in the flow chart of FIG. 15. This second phase is initiated with steps S71–S73 to close the pressure-holding valves 400, turn on the pump motor 376 and close the closing the pressure control valves 370. Step S73 is followed by step S73' to open the inflow control valves 432. Then, step S74 is implement to determine whether the stop switch 202 is in the OFF state while the vehicle speed is lower than the threshold. If an affirmative decision (YES) is obtained in step S75 to determine whether the master cylinder pressure PMC detected by the master cylinder pressure sensor 534 provided in the first sub-system is higher than a predetermined value $\beta 1$. If an affirmative decision (YES) is obtained in step S75, the control flow goes to steps S80–S82 which have been described with respect to the first embodiment. If an affirmative decision (YES) is obtained in step S82, the control flow goes to step S82' to determine whether an absolute value of a difference $\Delta P$ between fluid pressures detected by the two master cylinder pressure sensors 534, 536 is larger than a predetermined threshold $\Delta Ps$. If an affirmative decision (YES) is obtained in step S82', the control flow goes to step S77 to determine that at least one of the pressurizing devices 520, 522 is abnormal.

In the present fifth embodiment, the pressurizing devices 520, 522 are diagnosed on the basis of not only the fluid pressure detected by the master cylinder pressure 34 but also the difference between the fluid pressures detected by the two master cylinder pressure sensors 534, 536, as described above. This arrangement improves the accuracy of detection of an abnormality of the pressurizing devices 520, 522. In the present embodiment, a portion of the pressure control device 530 assigned to implement step S82' constitutes a major portion of a determining portion for determining whether the pressurizing devices 520, 522 are abnormal or not, on the basis of the detected pressure difference $\Delta P$.

Step S75 may be modified to determine whether the fluid pressure (master cylinder pressure PMC) detected by the master cylinder pressure sensor 536 is higher than the predetermined value $\beta 1$.

In the fourth and fifth embodiments of FIGS. 13 and 14, the pressurizing devices 378, 620, 522 are arranged to pressurize the fluid delivered from the master cylinder 314. However, those pressurizing devices may be arranged to pressurize the fluid in a master reservoir, as in the first embodiment of FIG. 1. In this case, the fluid pressure detected by the master cylinder pressure sensor does not include a component corresponding to the operating force acting on the brake pedal 310. Accordingly, the diagnosis on the basis of the fluid pressure detected during an operation of the brake pedal 310 is not influenced by the operation of the brake pedal 310.

It is to be understood that the present invention may be embodied with various other changes, modifications and improvements, such as those described in the SUMMARY OF THE INVENTION, which may occur to those skilled in the art.

What is claimed is:

1. A diagnosing apparatus for diagnosing a pressurizing device provided in a hydraulically operated braking system operated by a brake operating member, said diagnosing apparatus comprising:

a hydraulic pressure detecting device operable to detect a hydraulic pressure which is a sum of a first fluid pressure generated by an operation of said brake operating member, and a second fluid pressure generated by an operation of said pressurizing device; and a diagnosing device operable to determine whether said pressurizing device is abnormal or not, on the basis of said hydraulic pressure detected while said brake operating member is not in operation and while said pressurizing device is in operation.

2. A diagnosing apparatus according to claim 1, further comprising a vehicle speed detecting device for detecting a running speed of an automotive vehicle on which the hydraulically operated braking system is provided, and wherein said diagnosing device includes a determining portion operable to determine whether said pressurizing device is abnormal or not, on the basis of said hydraulic pressure detected while said running speed of the automotive vehicle detected by said vehicle speed detecting device is lower than a predetermined first threshold value.

3. A diagnosing apparatus according to claim 2, further comprising a second terminating device for terminating an operation of said diagnosing device when said running speed of the automotive vehicle detected by said vehicle speed detecting device has exceeded a predetermined second threshold value during the operation of said diagnosing device.

4. A diagnosing apparatus according to claim 1, further comprising:
   a ready-state detecting device for determining whether an automotive vehicle on which the hydraulically operated braking system is provided is ready for running, or not; and
   a braking operation detecting device for determining whether said brake operating member is in operation or not,
   and wherein said diagnosing device includes a determining portion operable to determine whether said pressurizing device is abnormal or not, on the basis of said hydraulic pressure detected when said brake operation detecting device detects for the first time that said brake operating member is in operation, after said ready-state detecting device has detected that the automotive vehicle becomes ready for running.

5. A diagnosing apparatus according to claim 1, wherein said hydraulic pressure detecting device is connected to a fluid passage provided to deliver a fluid pressurized by said pressurizing device to an actuator of the hydraulically operated system, said diagnosing apparatus further comprising:
   a fluid communication regulating device provided in a portion of said fluid passage between said hydraulic pressure detecting device and said actuator, and having an open state for non-restricted fluid communication between said pressurizing device and said actuator, and a restricted state for restricted fluid communication between said pressurizing device and said actuator,
   and wherein said diagnosing device includes a restricted-state determining portion operable to determine whether said pressurizing device is abnormal or not, on the basis of said hydraulic pressure detected while said fluid communication regulating device is placed in said restricted state.

6. A diagnosing apparatus according to claim 5, wherein said diagnosing device determines whether said pressurizing device is abnormal or not, depending upon whether said brake operating member is operated within a predetermined time after said fluid communication regulating device is operated from said restricted state to said open state.

7. A diagnosing apparatus according to claim 6, wherein said fluid communication regulating device is provided in a portion of said fluid passage which connects said actuator and a master cylinder which is operatively connected to said brake operating member and which generates a fluid pressure corresponding to an operating condition of said brake operating member.

8. A diagnosing apparatus according to claim 5, wherein said diagnosing device includes a regulating-device control device operable to operate said fluid communication regulating device from said restricted state to said open state when said hydraulic pressure detected by said hydraulic pressure detecting device indicates that said pressurizing device is normal.

9. A diagnosing apparatus according to claim 1, further comprising a first terminating device for terminating an operation of said diagnosing device when said brake operating member is operated during the operation of said diagnosing device.

10. A diagnosing apparatus according to claim 1, wherein said diagnosing device determines that said pressurizing device is abnormal, when said hydraulic pressure detected by said hydraulic pressure detecting device is lower than a threshold value determined by an operating condition of said pressurizing device.

11. A diagnosing apparatus according to claim 10, wherein said diagnosing device includes a threshold determining device for determining said threshold value of said hydraulic pressure depending upon said operating condition of said pressurizing device.

12. A diagnosing apparatus according to claim 1, wherein said diagnosing device includes a pressurizing-device control device for controlling said pressurizing device such that said pressurizing device is operated in a predetermined operating condition.

13. A diagnosing apparatus according to claim 1, wherein said diagnosing device determines whether said pressuring device is abnormal or not, on the basis of a plurality of values of said hydraulic pressure which are obtained by said hydraulic pressure detecting device when said pressurizing device is operated in respective different operating conditions.

14. A diagnosing apparatus according to claim 13, wherein said diagnosing device includes a first control portion for operating said pressurizing device in a predetermined first operating condition, and a second control portion for operating said pressurizing device in a predetermined second operating condition different from said predetermined first operating condition.

15. A diagnosing apparatus according to claim 13, wherein said diagnosing device includes a pressure-data memory for storing values of said hydraulic pressure detected by said hydraulic pressure detecting device in said respective different operating conditions of said pressurizing device, said diagnosing device effecting diagnostic determinations at different times as to whether said pressurizing device is abnormal or not, such that a present one of said diagnostic determinations is effected on the basis of said plurality of values of said hydraulic pressure at least one of which is stored in said pressure-data memory and was detected in another of said diagnostic determinations during an operation of said pressurizing device in the operating condition different from the operating condition in which said pressurizing device is operated to effect said present one of said diagnostic determinations.

16. A diagnosing apparatus according to claim 1, wherein said diagnosing device includes at least one of (a) a first determining portion operable to determine whether said pressurizing device is abnormal or not, on the basis of said hydraulic pressure detected by said hydraulic pressure detecting device while said pressurizing device is not in operation, and (b) a second determining portion operable to determine whether said pressurizing device is abnormal or not, on the basis of said hydraulic pressure detected by said hydraulic pressure detecting device while said brake operating member is in operation.

17. A diagnosing apparatus according to claim 1, wherein said diagnosing device includes a multiple-phase determining portion for determining whether said pressurizing device is abnormal or not, on the basis of at least two relationships each of which is a relationship among at least two physical quantities selected from the group consisting of: a quantity indicative of an operating condition of said pressurizing device; said hydraulic pressure detected by said hydraulic pressure detecting device; and a deceleration value of an automotive vehicle on which the hydraulically operated braking system is provided.

18. A diagnosing apparatus according to claim 1, wherein said hydraulically operated braking system has a plurality of fluid passages extending from said pressurizing device, and said hydraulic pressure detecting device includes a plurality of pressure sensors connected to said plurality of fluid passages, respectively, said diagnosing device determining whether said pressuring device is abnormal or not, on the basis of a difference between values of said hydraulic pressure detected by said plurality of pressure sensors.

19. A diagnosing apparatus according to claim 1, wherein said pressurizing device includes a pump (66; 374) for pressurizing a working fluid, and a pump motor (68; 376) for operating said pump.

20. A diagnosing apparatus according to claim 1, wherein said pressurizing device includes a solenoid-operated pressure control valve (70; 370) for controlling a pressure of a working fluid pressurized by the pressurizing device.

21. A diagnosing apparatus for diagnosing a first pressuring device and a second pressurizing device provided in a hydraulically operated braking system which includes (1) a master cylinder having two pressurizing chambers and operable by a brake operating member to generate in said two pressurizing chambers a hydraulic pressure corresponding to an operating force acting on said brake operating member, (2) a first group of brake cylinders connected to a first fluid passage extending from one of said two pressurizing chambers, and a second group of brake cylinders connected to a second fluid passage extending from the other of said two pressurizing chambers, and (3) said first and second pressurizing devices operable to deliver a pressurized fluid through said first and second fluid passages, respectively, while said brake operating member is not in operation, characterized by comprising:

a first and a second pressure detecting device connected to said first and second fluid passages, respectively; and a diagnosing device operable to determine whether at least one of said first and second pressurizing devices is abnormal or not, on the basis of a difference between hydraulic pressure values detected by said first and second hydraulic pressure detecting devices while said brake operating member is not in operation and while said first and second pressurizing devices are operated in the same operating condition.

22. A diagnosing apparatus for diagnosing a pressurizing device provided in a hydraulically operated braking system which includes a brake operating member and a master cylinder having a pressurizing piston which is advanced by a drive force produced by the pressurizing device and an operating force applied to the brake operating member and which partially defines a pressurizing chamber, said diagnosing apparatus comprising:

a master cylinder pressure detecting device operable to detect a hydraulic pressure in said pressurizing chamber of said master cylinder; and a diagnosing device operable to determine whether said pressurizing device is abnormal or not, on the basis of the hydraulic pressure detected by said master cylinder pressure detecting device while said brake operating member is not in operation and while said pressurizing device is in operation.

23. A diagnosing apparatus according to claim 22, wherein said pressurizing piston of said master cylinder partially defines a front pressurizing chamber as said pressurizing chamber on one of opposite sides thereof, and a rear pressurizing chamber on the other of said opposite sides thereof, said pressurizing device being connected to said rear pressurizing chamber.

\* \* \* \* \*